(12) United States Patent
Sugioka et al.

(10) Patent No.: US 7,861,498 B2
(45) Date of Patent: Jan. 4, 2011

(54) ARTICLE TRANSFER DEVICE, AND PACKAGING DEVICE AND WEIGHING DEVICE EQUIPPED THEREWITH

(75) Inventors: Yukio Sugioka, Shiga (JP); Shinichi Fujita, Shiga (JP); Tadashi Matsugi, Shiga (JP); Masahiro Hasegawa, Kyoto (JP)

(73) Assignee: Ishida Co., Ltd., Kyoto (JP)

( * ) Notice: Subject to any disclaimer, the term of this patent is extended or adjusted under 35 U.S.C. 154(b) by 333 days.

(21) Appl. No.: 12/160,832

(22) PCT Filed: Jun. 5, 2007

(86) PCT No.: PCT/JP2007/061337

§ 371 (c)(1),
(2), (4) Date: Jul. 14, 2008

(87) PCT Pub. No.: WO2007/142220

PCT Pub. Date: Dec. 13, 2007

(65) Prior Publication Data

US 2010/0223886 A1    Sep. 9, 2010

(30) Foreign Application Priority Data

Jun. 6, 2006    (JP)    ............................. 2006-157563

(51) Int. Cl.
*B65B 39/12*    (2006.01)
*B65B 37/18*    (2006.01)

(52) U.S. Cl. ............................. 53/502; 53/247; 53/248; 53/260

(58) Field of Classification Search ................... 53/502, 53/247, 248, 255, 257, 260, 284.7, 570; 141/313, 141/314, 341, 345; *B65B 39/12, 37/18, 1/06*
See application file for complete search history.

(56) References Cited

U.S. PATENT DOCUMENTS 3,057,382 A * 10/1962 Baker ........................... 53/570

FOREIGN PATENT DOCUMENTS

| EP | 526617 B1 * | 7/1995 |
| EP | 856468 A1 * | 8/1998 |
| FR | 2598679 A1 * | 11/1987 |
| JP | S62-143601 U | 9/1987 |
| JP | S63-272601 A | 11/1988 |
| JP | H05-68804 U | 9/1993 |
| JP | 10211908 A * | 8/1998 |
| JP | 3778744 B2 | 3/2006 |

\* cited by examiner

*Primary Examiner*—Stephen F Gerrity
(74) *Attorney, Agent, or Firm*—Global IP Counselors, LLP

(57) ABSTRACT

When the articles dropping from above are received inside a hopper, at least a bottom portion of the hopper is allowed to move downwardly with the bottom portion of the hopper being closed. Therefore, the collision speed between the articles and the bottom portion of the hopper is reduced. In addition, by opening the bottom portion of the hopper while moving the bottom portion downwardly, the downward initial speed is added to the articles to be discharged.

6 Claims, 16 Drawing Sheets

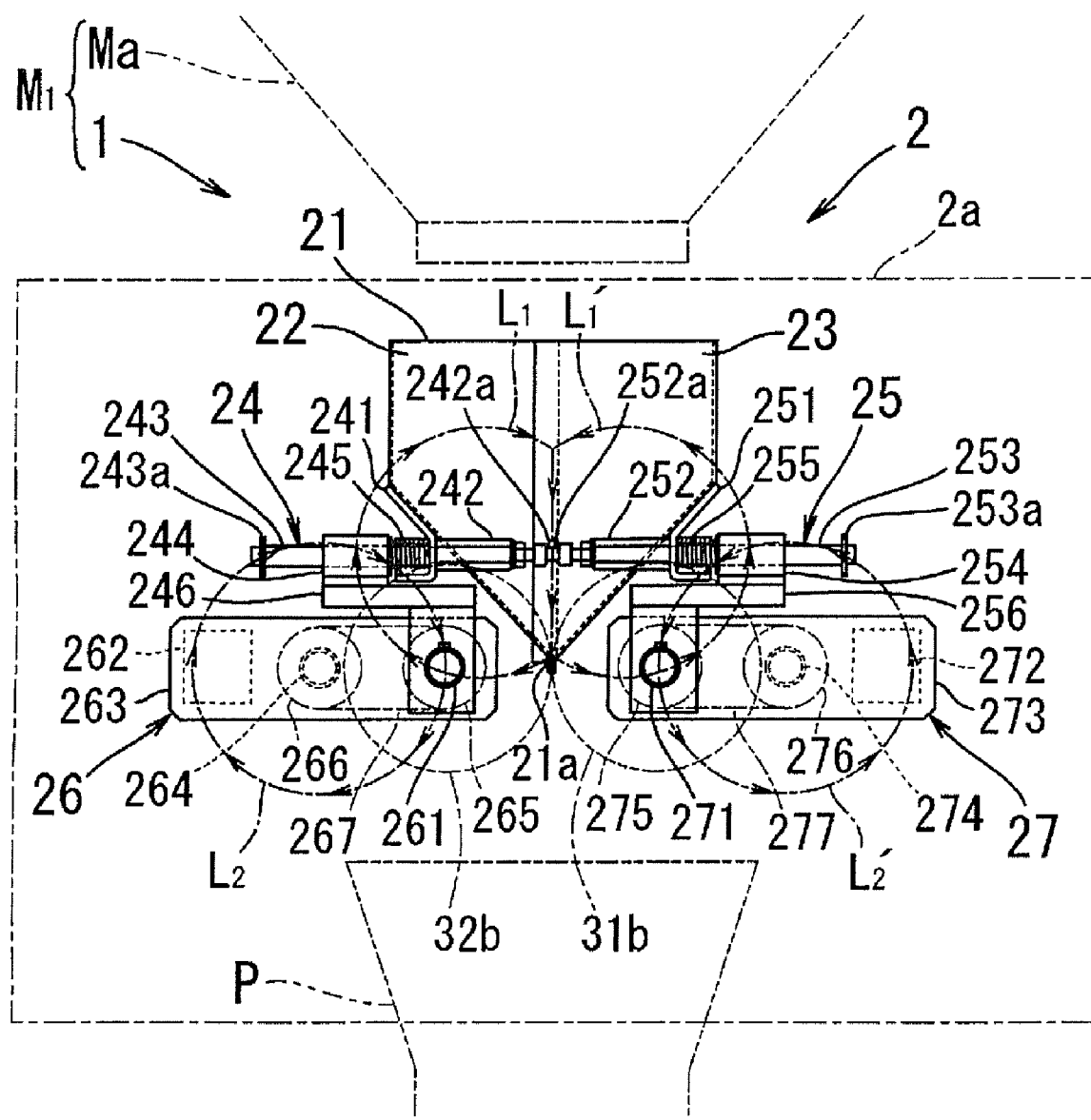
F I G. 2

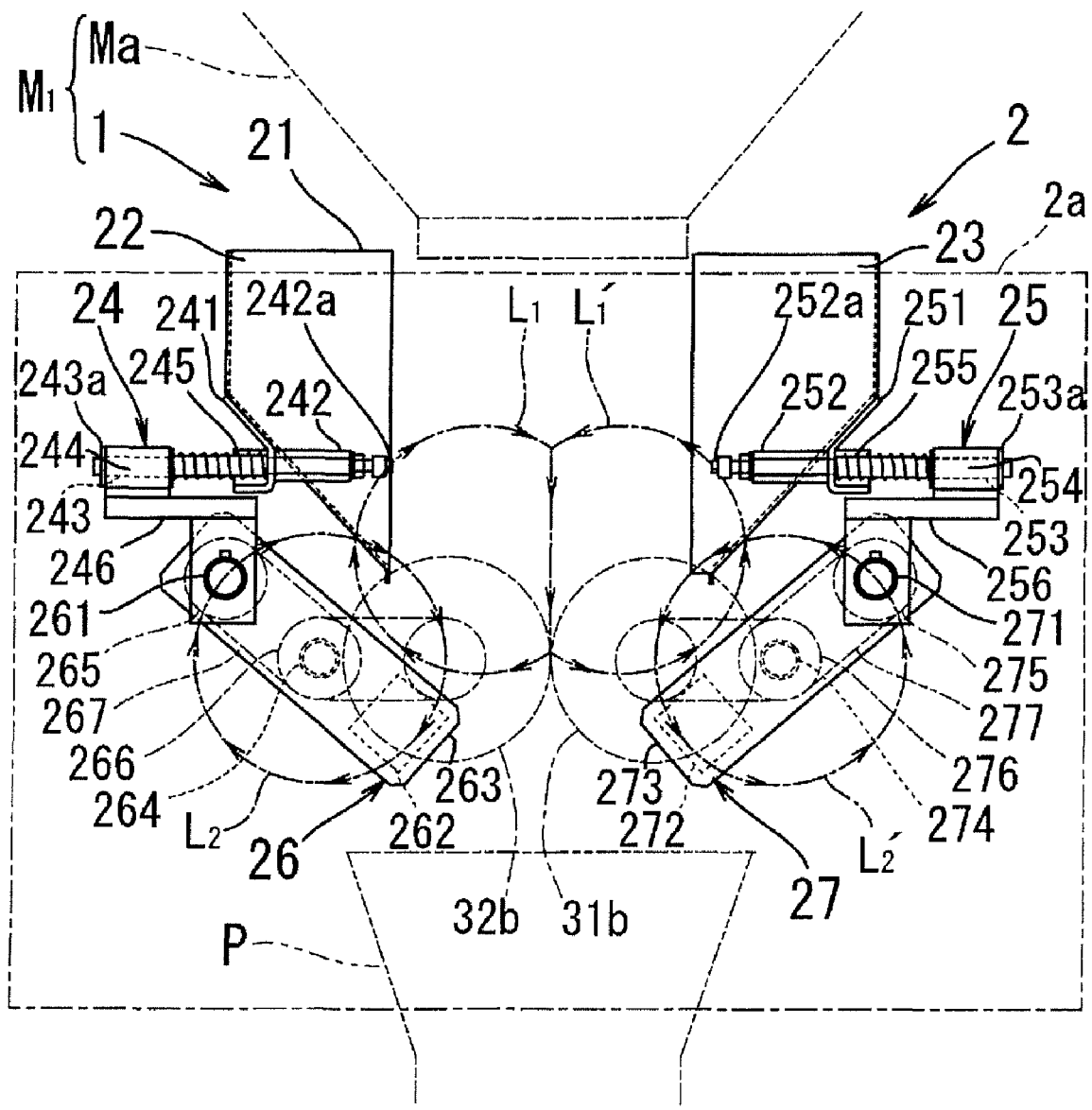
F I G. 5

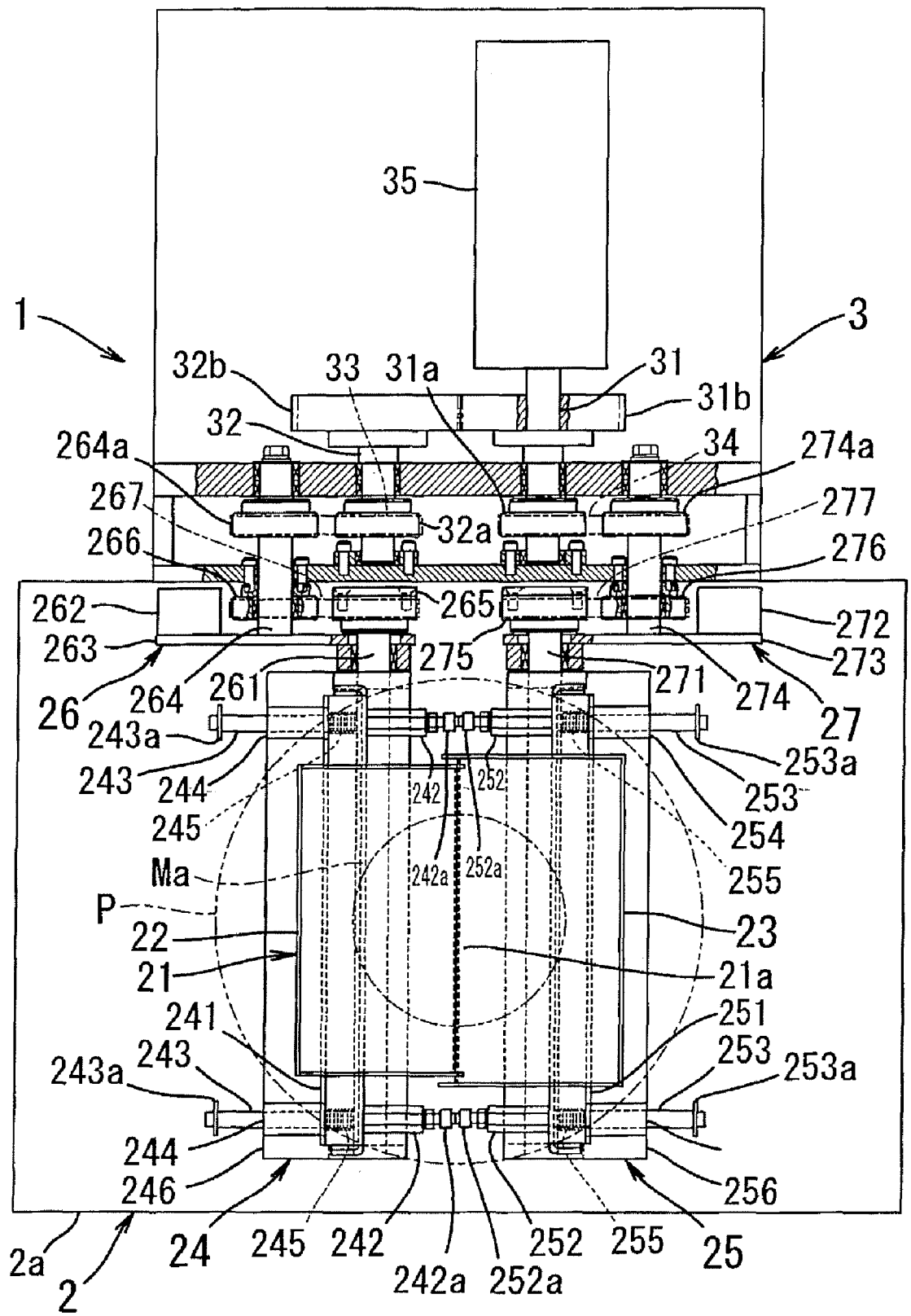
F I G. 6

F I G. 7a
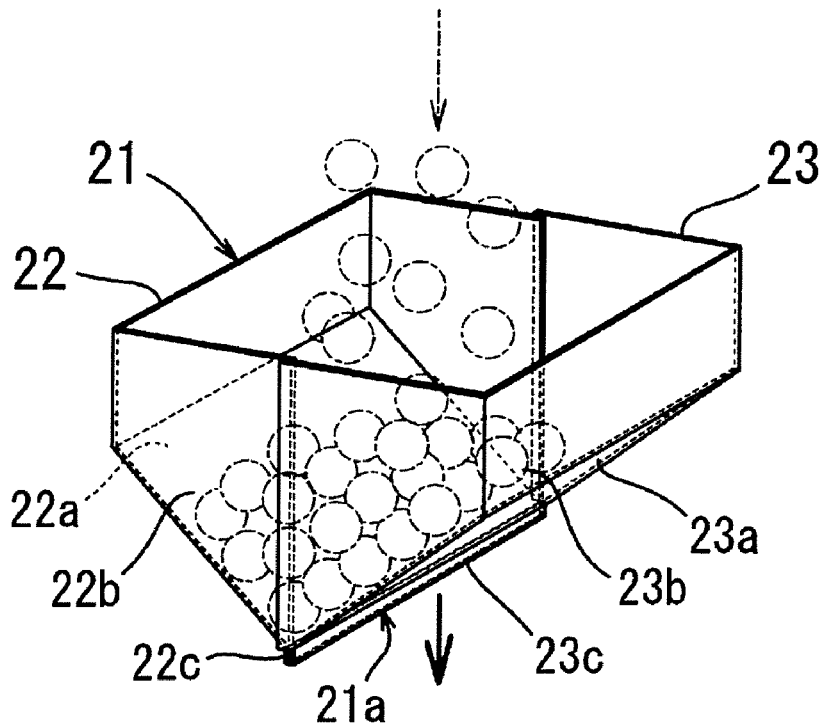
F I G. 7b
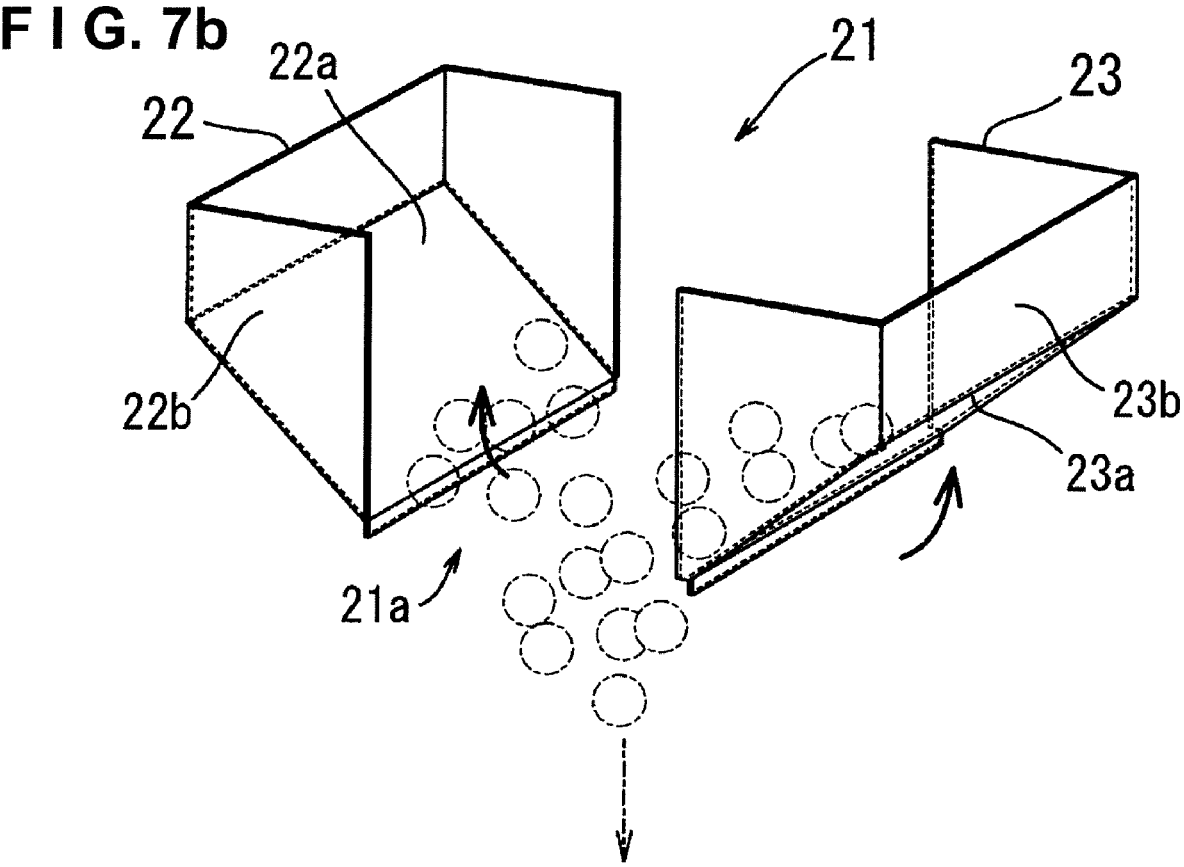

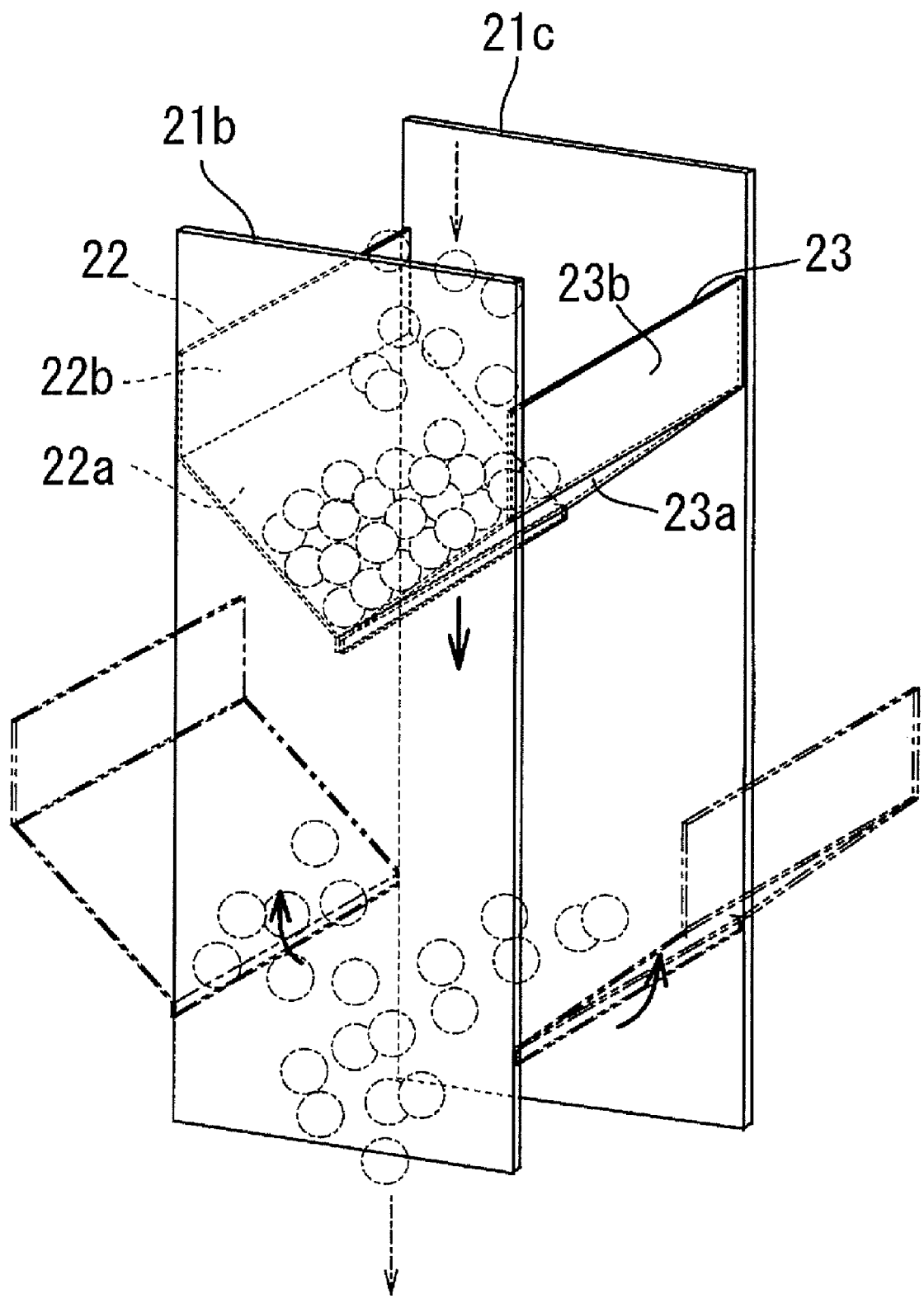
F I G. 9

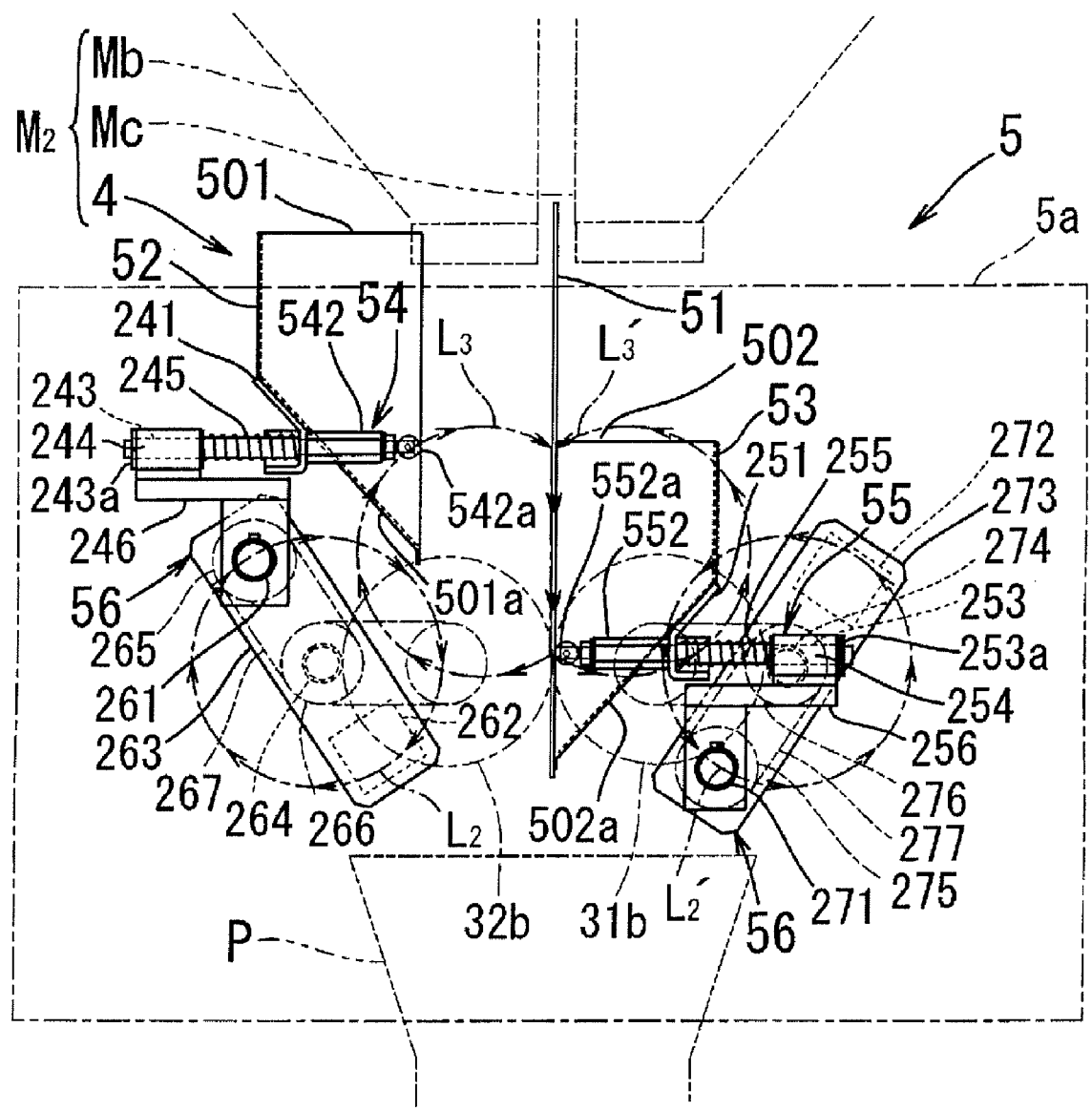
F I G. 14

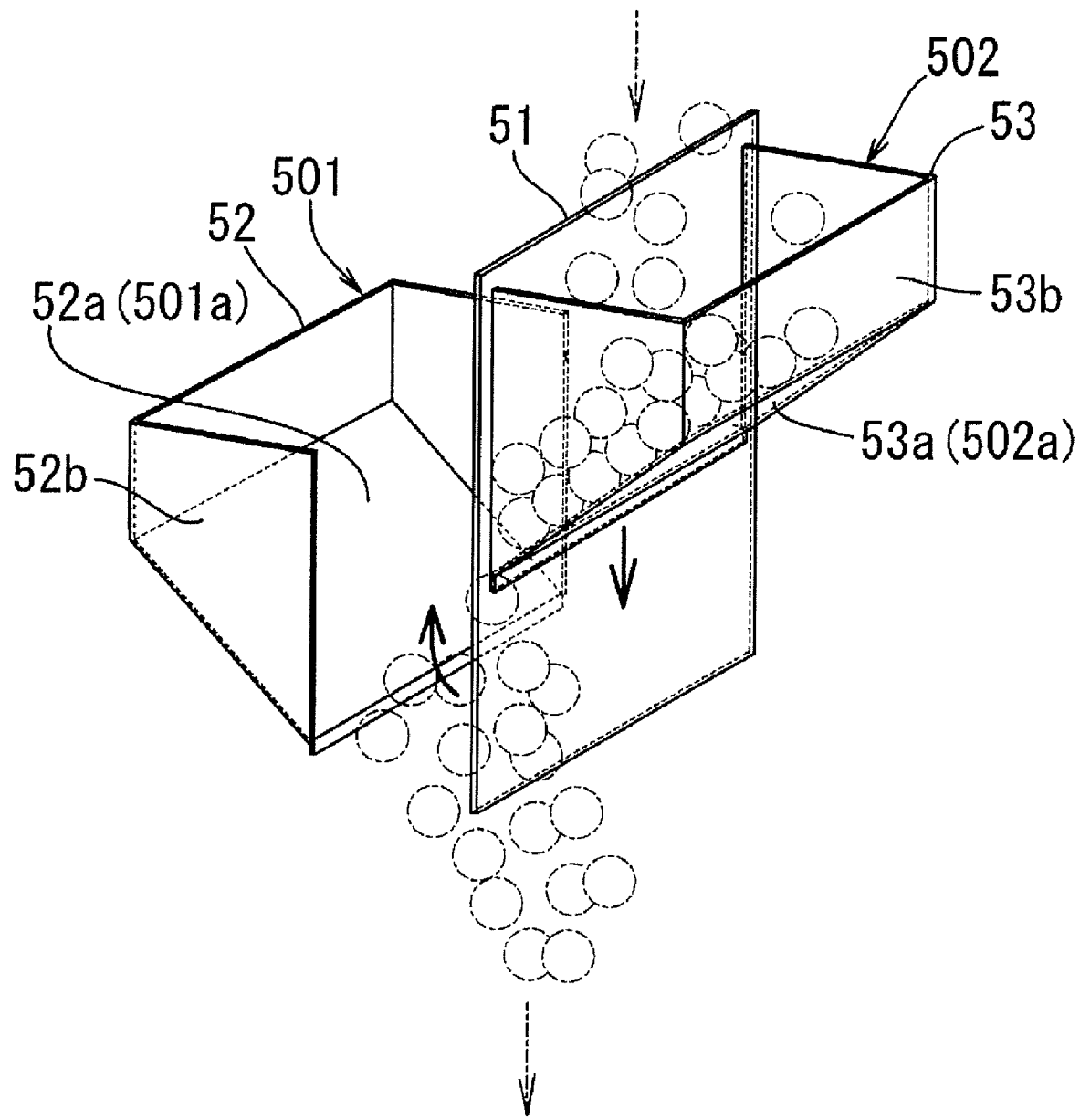
F I G. 15

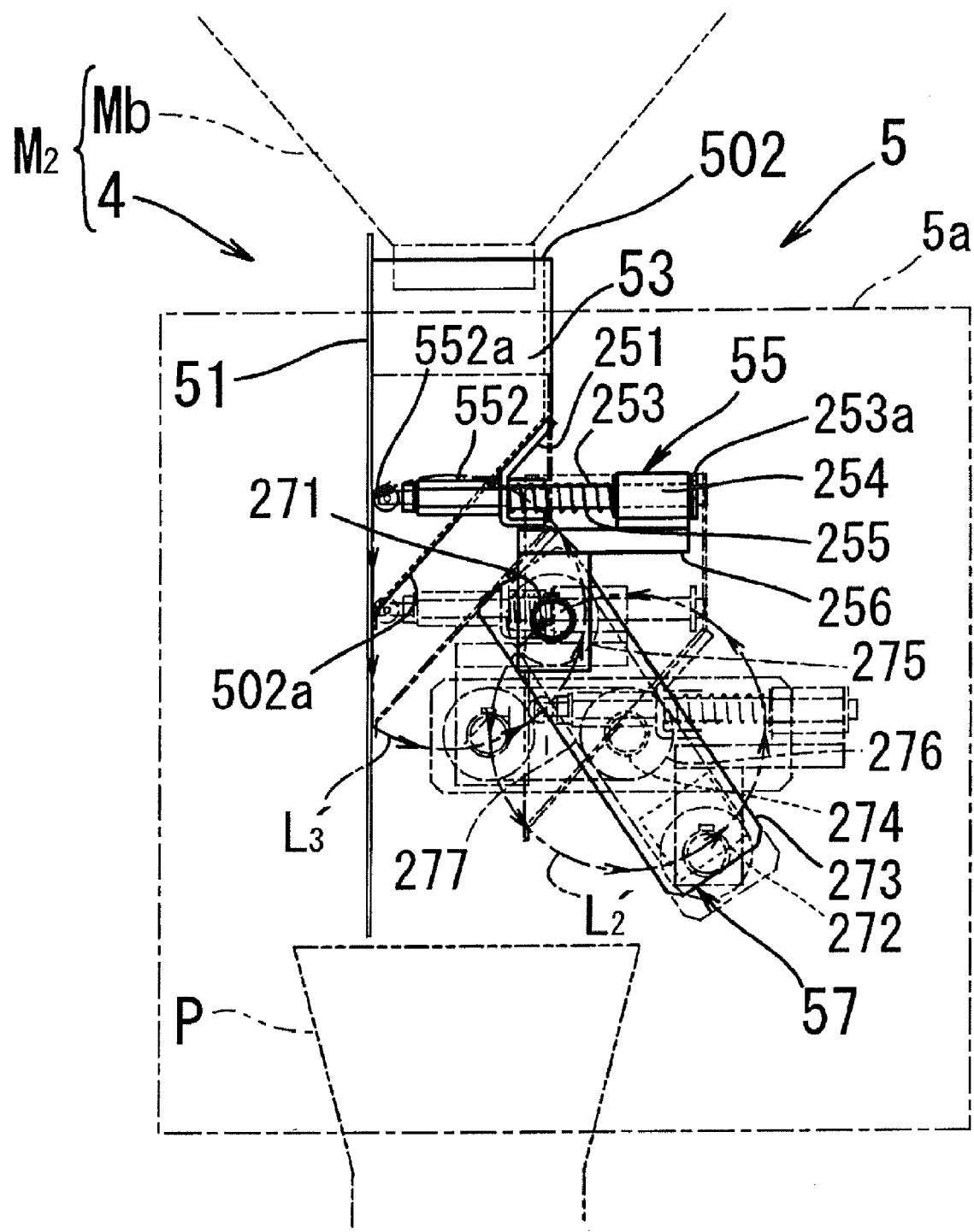
F I G. 16

ARTICLE TRANSFER DEVICE, AND PACKAGING DEVICE AND WEIGHING DEVICE EQUIPPED THEREWITH

CROSS-REFERENCE TO RELATED APPLICATIONS

This U.S. national phase application claims priority to Japanese Patent Application No. 2006-157563 filed on Jun. 6, 2006. The entire disclosure of Japanese Patent Application No. 2006-157563 is hereby incorporated herein by reference.

TECHNICAL FIELD

The present invention relates to an article transfer device equipped with a hopper for receiving goods (articles) falling from above and discharging them downwardly and to a packaging device and a weighing device equipped with the article transfer device.

BACKGROUND ART

In the event that goods which ere weighed to predetermined weight are allowed to fall and discharged to be filled and packed in bags, an article transfer device equipped with a timing hopper that temporarily stores the weighed goods, opens a gate according to a cycle of filling operation, and supplies the good into bags is set up. Such transfer device is able to drop and discharge the goods at a stroke at a predetermined timing after the goods are temporarily stored in the timing hopper; continuous filling in a high-speed cycle is enabled. However, in the event that the goods to be filled are hard and have a high restitution coefficient, goods jump up and down greatly when they are fed into the timing hopper and become poorly organized; the feeding time is unable to be satisfactorily shortened. In addition, in the event that the gate opens while goods are being fed into the timing hopper, goods jump up and down greatly even in bags, sometimes making the feeding time all the more longer.

Consequently, in the midst of feeding goods, bag seal operation is conducted, and the goods to be filled may not be filled, resulting in a great weight error or goods are caught between seal portions, resulting in seal failure. Therefore, Japanese Unexamined Patent Application Publication No. 62-143601 proposes a technique for setting up multiple timing hoppers in the longitudinal direction, and temporarily banking up goods with each timing hopper and then, supplying the goods to downstream timing hoppers so that the dropping speed is thereby lowered and the goods are allowed to quickly fit into hoppers or bags.

DISCLOSURE OF THE INVENTION

In the meantime, the above proposed technique purports to lower the goods dropping speed; therefore, the goods discharging pace could be quickened but marked lowering of the goods discharge speed cannot be avoided, and it is difficult to further speed up the goods-feeding. Furthermore, goods are allowed to repeatedly collide against timing hoppers installed in multiple units and there is a fear of damaging (breaking or chipping) the goods. Furthermore, the goods are completely made immovable by timing hoppers and are discharged without energy; the goods flow becomes poor and clogging at the time of filling may be generated.

In view of such circumstances, the present invention prevents lowering the discharge speed of goods, damaging of goods, or clogging of goods while preventing goods from jumping up and down in hoppers in an article transfer device equipped with a hopper that receives goods falling from above and discharges them to downwardly, and a packaging device and a weighing device, which are equipped with the article transfer device.

Means to Solve the Problems

A first aspect of the present invention provides an article transfer device having a hopper configured and arranged to receive goods dropping from above and to discharge them downwardly, and a hopper moving mechanism configured and arranged to move at least a bottom portion of the hopper downwardly with the bottom portion of the hopper being closed when the hopper receives the goods and to open the bottom portion of the hopper to discharge the goods from the hopper.

A second aspect of the present invention provides the article transfer device according to the first aspect of the present invention, wherein the hopper moving mechanism is configured and arranged to discharge the goods after the goods are temporarily stored inside the hopper.

A third aspect of the present invention provides the article transfer device according to the first or the second aspect of the present invention, wherein the hopper moving mechanism is configured and arranged to move at least the bottom portion of the hopper continuously in one direction along a movement path.

A fourth aspect of the present invention provides the article transfer device according to any of the first to the third aspects of the present invention, wherein the hopper includes a pair of gates facing each other, and the hopper moving mechanism is configured and arranged to move the gates close to each other, to move the gates downwardly with the bottom portion of the hopper being closed, to separate the gates away from each other, and to open the bottom portion of the hopper.

A fifth aspect of the present invention provides the article transfer device according to any of the first to the thirds aspects of the present invention, wherein the hopper includes a fixed wall and a gate installed opposite to the fixed wall, and the hopper moving mechanism is configured and arranged to move the gate downwardly with a lower end part of the gate being adjacent to the fixed wall so that the bottom portion of the hopper is closed, and to separate the gate from the fixed wall to open the bottom portion of the hopper.

A sixth aspect of the present invention provides the article transfer device according to the fifth aspect of the present invention, wherein the hopper includes an additional gate installed on an opposite side from the gate with respect to the fixed wall, and the hopper moving mechanism is configured and arranged to move the gate and the additional gate so that the articles are discharged from the gate and the additional gate alternately.

A seventh aspect of the present invention provides the article transfer device according to any of the fourth to the sixth aspects of the present invention, wherein the gate includes a pair of plate members with a predetermined width and a pair of fixed side wall members extending in a direction perpendicular to a width direction of the plate members with the plate members being disposed between the fixed side wall members.

An eighth aspect of the present invention provides an article transfer device according to any of the first to the seventh aspects of the present invention, wherein the hopper moving mechanism is configured and arranged to move the hopper downwardly with the bottom portion of the hopper being closed when the hopper receives the goods.

A ninth aspect of the present invention provides a weighing device having a weighing unit configured and arranged to discharge goods weighed to a predetermined weight and the article transfer device in accordance with any of the first to the eighth aspects of the present invention to transfer the goods discharged from the weighing unit downwardly.

A tenth aspect of the present invention provides a packaging device having the article transfer device according to any of the first to eighth aspects of the present invention to transfer the goods dropping from above and discharges them downwardly and a packaging unit configured and arranged to receive the goods discharged from the article transfer device and to fill and package the goods into packaging containers.

According to the article transfer device described in the first or the second aspect of the present invention, the following outstanding effects are achieved. In concert with the goods dropping movement, the closed bottom of a hopper moves downwardly. Therefore, the goods are not made completely immovable in the hopper and do not damage the dropping speed as in the case of the conventional article transfer device. As a result, it is possible to prevent the goods discharge speed from the hopper from lowering and to prevent clogging in goods filling generated in linkage with the lowered goods discharging speed. Furthermore, the collision speed of dropping goods against the hopper bottom can be reduced because of downward movement of the hopper bottom. The goods can eliminate or reduce jumping up and down inside the hopper, and at the same time, damage to the goods can be prevented.

According to the article transfer device described in the third aspect of the present invention, the following outstanding effect is achieved in addition to the effects achieved by the article transfer device described in the first or the second aspect. The hopper bottom continuously moves in one direction, and therefore, as compared to a conventional hopper which drives the gate to reciprocatedly rotate to open and close, the hopper is subject to a smaller physical burden and can discharge the goods at still faster speed.

According to the article transfer device described in the fourth aspect of the present invention, the following outstanding effect is achieved in addition to the effects achieved by the article transfer device described in any of the first to the third aspects of the present invention. The bottom is opened with a pair of counter-facing gates kept separated from each other, and therefore, as compared to a conventional hopper which drives the gate to reciprocatedly rotate to open and close, the hopper is able to form a large discharge port in a short time, which is useful for discharging the goods at high speed.

According to the article transfer device described in the fifth aspect of the present invention, the following outstanding effect is achieved in addition to the effects achieved by the article transfer device described in any of the first to the third aspects of the present invention. The article transfer device described in the fifth aspect of the present invention has a hopper composed with a fixed wall and a gate opposite to the fixed wall, and since the gate is separated from the fixed wall to open the bottom, as compared to a conventional hopper which drives the gate to reciprocatedly rotate to open and close, the hopper is able to form a large discharge port in a short time, which is useful for discharging the goods at high speed. In addition, the fixed wall may be designed to guide the goods to increase the goods filling efficiency.

According to the article transfer device described in the sixth aspect of the present invention, the following outstanding effect is achieved in addition to the effects achieved by the article transfer device described in the fifth aspect of the present invention. Gates are installed on both sides of the fixed wall and discharge the goods alternately; therefore, feeding the goods from above each gate alternately can further increase the goods discharge cycle speed.

According to the article transfer device described in the seventh aspect of the present invention, the following outstanding effect is achieved in addition to the effects achieved by the article transfer device described in any of the fourth to the sixth aspects of the present invention. The gate is formed with a plate piece with a predetermined width and is set up as if the gate is caught between two fixed side walls extending in a direction that crosses at right angles with the width direction. This eliminates a need to provide side walls to the gate itself and can reduce the weight of the gate. As a result, a physical burden applied to the gate drive mechanism can be suppressed and high-speed discharge of the goods can be achieved.

According to the article transfer device described in the eighth aspect of the present invention, the following outstanding effect is achieved. In concert with the goods dropping movement, the hopper is moved downwards; therefore, it is possible to eliminate or reduce jumping of the goods inside the hopper while increasing the goods discharging speed from the hopper and at the same time, it is possible to prevent damage and clogging of the goods.

According to the weighing device described in the ninth and the packing device described in the tenth aspects of the present invention, effects same as those the article transfer device described in any of the first to the eighth aspects achieve can achieve.

BRIEF DESCRIPTION OF DRAWINGS

FIG. 2 is a schematic front elevational view of the article transfer device according to the first embodiment and shows the movement of a hopper following a state shown in FIG. 1;

FIG. 5 is a schematic front elevational view of the article transfer device according to the first embodiment and shows the movement of the hopper following a state shown in FIG. 4;

FIG. 6 is a top plan view of the article transfer device according to the first embodiment when the hopper is in the state shown in FIG. 2;

FIGS. 7a and 7b are perspective views of the hopper of the article transfer device according to the first embodiment;

FIG. 9 is a perspective view of a hopper of the modification example shown in FIG. 8;

FIG. 14 is a schematic front elevational view of the article transfer device according to the second embodiment and shows the movement of the hopper following a state shown in FIG. 13;

FIG. 15 is a perspective view of the hopper of the article transfer device according to the second embodiment; and FIG. 16 is a schematic front elevational view showing a modification example of the article transfer device according to the second embodiment.

DETAIL DESCRIPTION OF PREFERRED EMBODIMENTS

First Embodiment

Article Transfer Device 1

Figure 1:
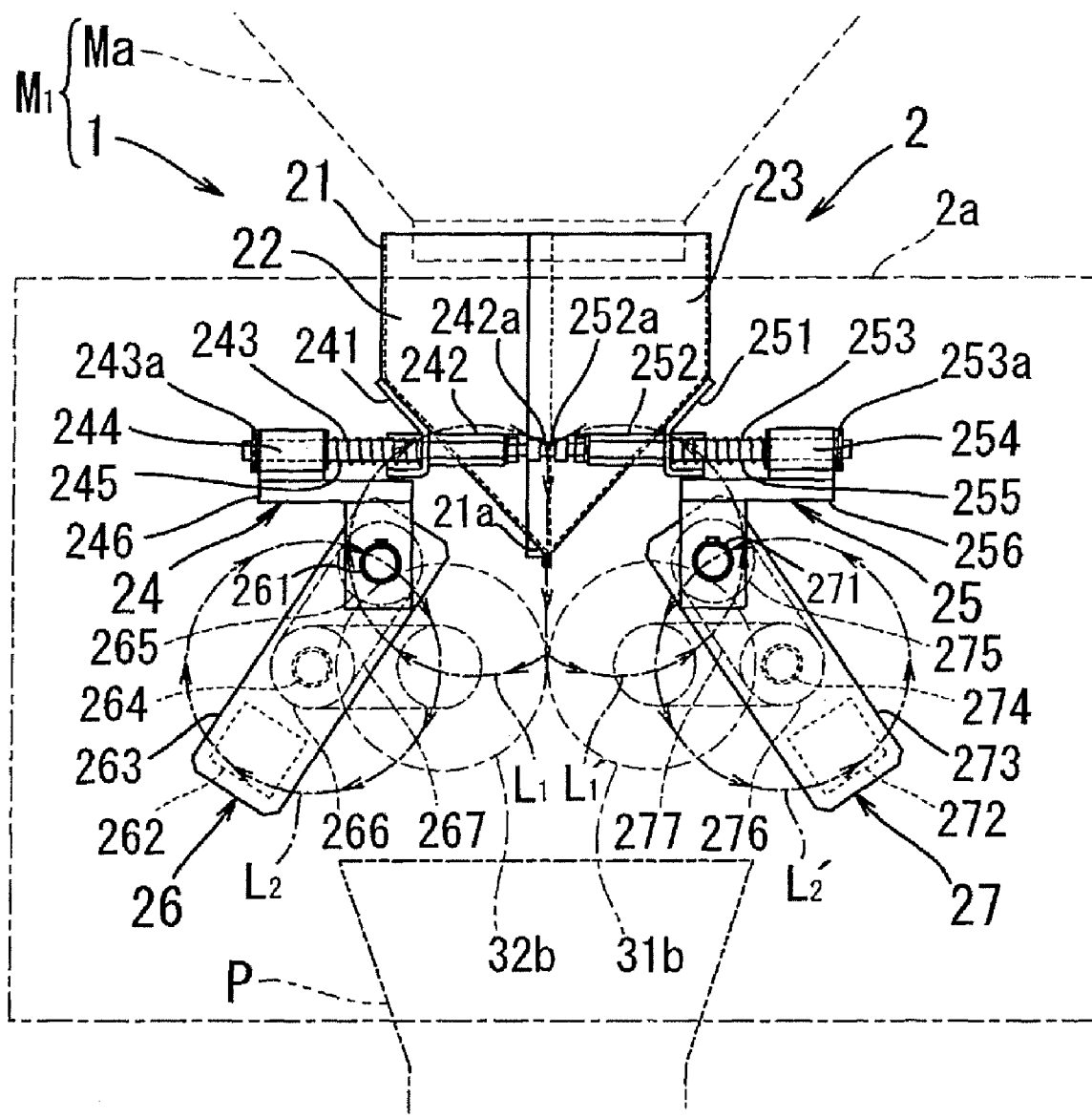
FIG. 1 is a schematic front elevational view of an article transfer device according to the first embodiment of the present invention.

FIG. 1 to FIG. 6 are figures showing an article transfer device 1 according to the first embodiment of the present invention. Of these, FIG. 1 to FIG. 5 are front views explaining movements of the article transfer device 1 and FIG. 6 is a plan view that corresponds to FIG. 2. FIGS. 7a and 7b are perspective views of a hopper 21 equipped to the article transfer device 1. The article transfer device 1 forms a part of a weighing device $M_1$ together with a weighing unit Ma that discharges the goods (articles) weighed to predetermined weight as shown in FIG. 1 to FIG. 5, receives the goods which drop and are discharged at predetermined intervals from the weighing unit Ma installed on the upper side, and discharges the goods to a packaging device P installed on the lower side. The packaging device P receives the goods discharged from the article transfer device 1 and fills and packages the goods in packaging bags. The article transfer device 1 includes a transfer unit 2 equipped with the hopper 21 that receives the goods dropping from the upper side and discharges the goods to the lower side, and a drive unit 3 that drives the hopper 21.

Transfer Unit 2

The transfer unit 2 is equipped with the hopper 21 having a pair of counter-facing gates 22 and 23, gate support units 24 and 25 that slidably support the gates 22 and 23 in the horizontal direction (right and left direction in the figure), and a pair of rotary mechanisms 26 and 27 that continuously rotate the gate support units 24 and 25 in one direction while maintaining them to a constant figure. In this embodiment, the gate support units 24 and 25 and the rotary mechanisms 26 and 27 constitute the hopper moving mechanism. The gates 22 and 23 move downwards in a state most adjacent to each other (FIG. 1 to FIG. 3) along each of two D-shape trajectories $L_1$ and $L_1'$ (movement path) drawn bilaterally-symmetrically with the linear portion used as an axis of symmetry. Then, the gates 22 and 23 move downwards to the lowermost end position in a state separated from each other, move upwards from the lowermost end position to the uppermost end position in a state separated from each other (FIG. 4 and FIG. 5), and repeat moving downwards from the uppermost end position to the position where the gates come closest to each other. The trajectories $L_1$ and $L_1'$ in FIG. 1 to FIG. 5 are trajectories of head-end units 242a and 252a of contact members 242 and 252 installed integrally to the gates 22 and 23.

Hopper 21, and Gates 22 and 23

The pair of gates 22 and 23 that form the hopper 21 has inclined rectangular bottom units 22a and 23a that form an inverted roof-shape bottom 21a (bottom portion) and inverted U-shaped side surface units 22b and 23b as viewed two-dimensionally as shown in FIG. 7a. When the gates 22 and 23 come closest to each other, the bottom 21a forms the closed bucket-shape hopper 21 and is ready to receive and temporarily store the goods dropping from above, while as shown in FIG. 7b, the gates 22 and 23 are separated from each other to open the bottom 21a, and are brought into a state that enables the goods stored inside the hopper 21 to drop and be discharged. That is, the gates 22 and 23 continuously move along each of the D-shape trajectories $L_1$ and $L_1'$ as shown in FIG. 1 to FIG. 5, and repeat: (1) coming closest to each other to close the bottom 21a of the hopper 21 and moving downwards in a state ready to receive the goods dropping from above; (2) moving downwards to the lowermost end position while changing the state from the closed bottom 21a to the state in which the gates 22 and 23 are separated from each other and are ready to discharge the goods; (3) moving upwards from the lowermost end position to the uppermost end position with the gates separated from each other to keep the bottom 21a open; and (4) moving downwards from the uppermost end position to the closest position where the bottom 21a is closed. The downward moving speed of the hopper 21 is set to be slower than the dropping speed of the goods discharged from the weighing unit Ma in order to temporarily store the goods discharged from the weighing unit Ma in the hopper. The gates 22 and 23 include flange units 22c and 23c for bringing lower end units into close contact free of any clearance as shown in FIG. 7a, and in addition, the side surface units 22b and 23b are partly superimposed, and the gate 23 is inserted into the gate 22 in the gate width direction to prevent any clearance from being formed.

Gate Support Units 24 and 25

The gate support units 24 and 25 include, as shown in FIG. 1 to FIG. 6, board-thickness support brackets 241 and 251 mounted to the gates 22 and 23 and extending in the gate width direction (vertical direction in FIG. 6), contact members 242 and 252 and sliding members 243 and 253 each one of which is mounted to both ends of these support brackets 241 and 251, guide members 244 and 254 that guide and support the sliding members 243 and 253 horizontally slidably, press members 245 and 255 that consistently press the support brackets 241 and 251 in the direction to bring them close to each other, and support units proper 246 and 256 which extend in the gate width direction and fix and support the guide members 244 and 254. The sliding members 243 and 253 are bars that extend in the approaching and separating direction of the gates, the guide members 244 and 254 are cylinders through which the sliding members 243 and 253 are inserted, and the press members 245 and 255 are coil springs joined to the sliding members 243 and 253. To the sliding members 243 and 253, stoppers 243a and 253a that serve as retainers from the guide members 244 and 254 are installed.

Figure 3:
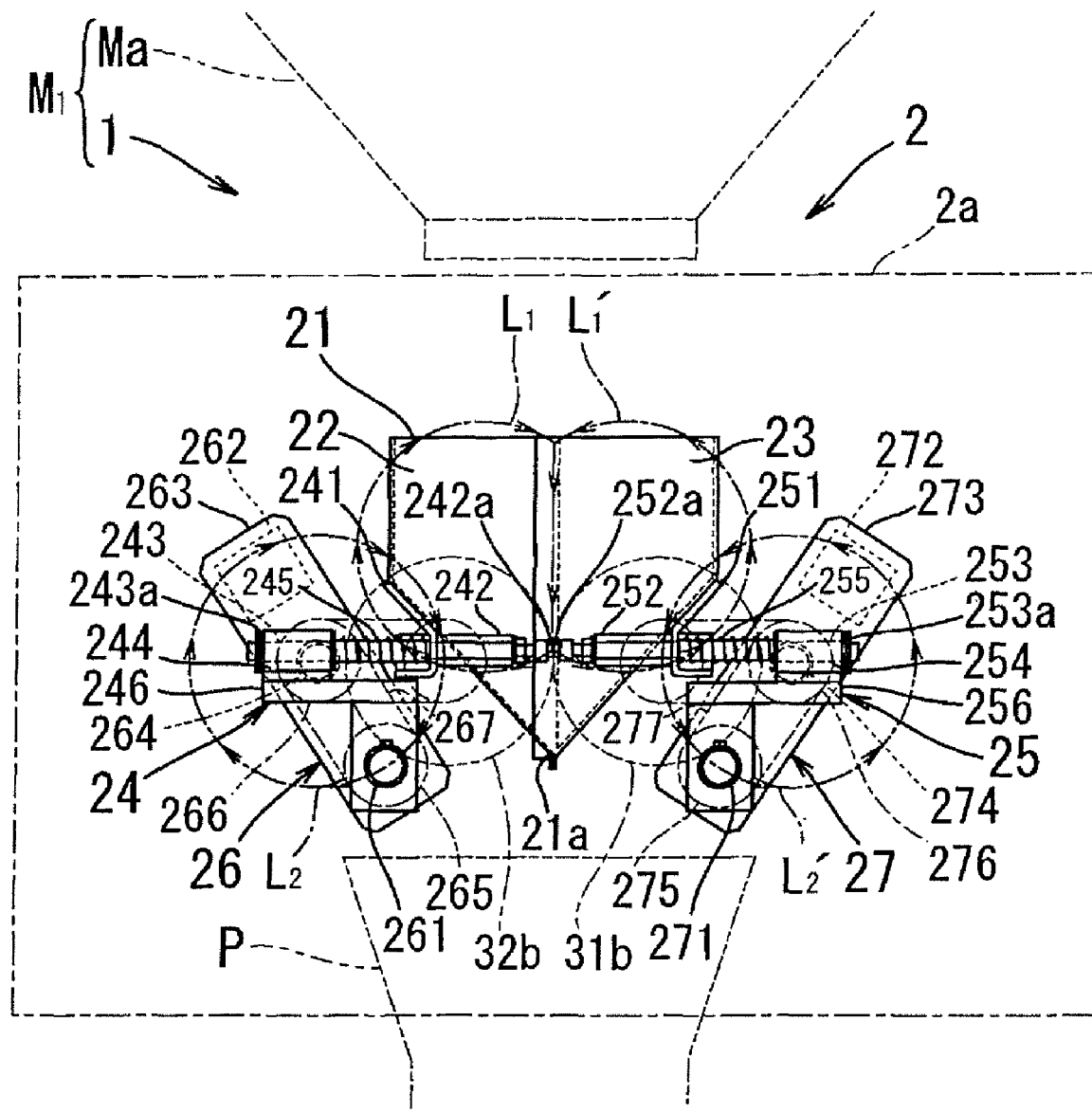
FIG. 3 is a schematic front elevational view of the article transfer device according to the first embodiment and shows the movement of the hopper following a state shown in FIG. 2.
Figure 4:
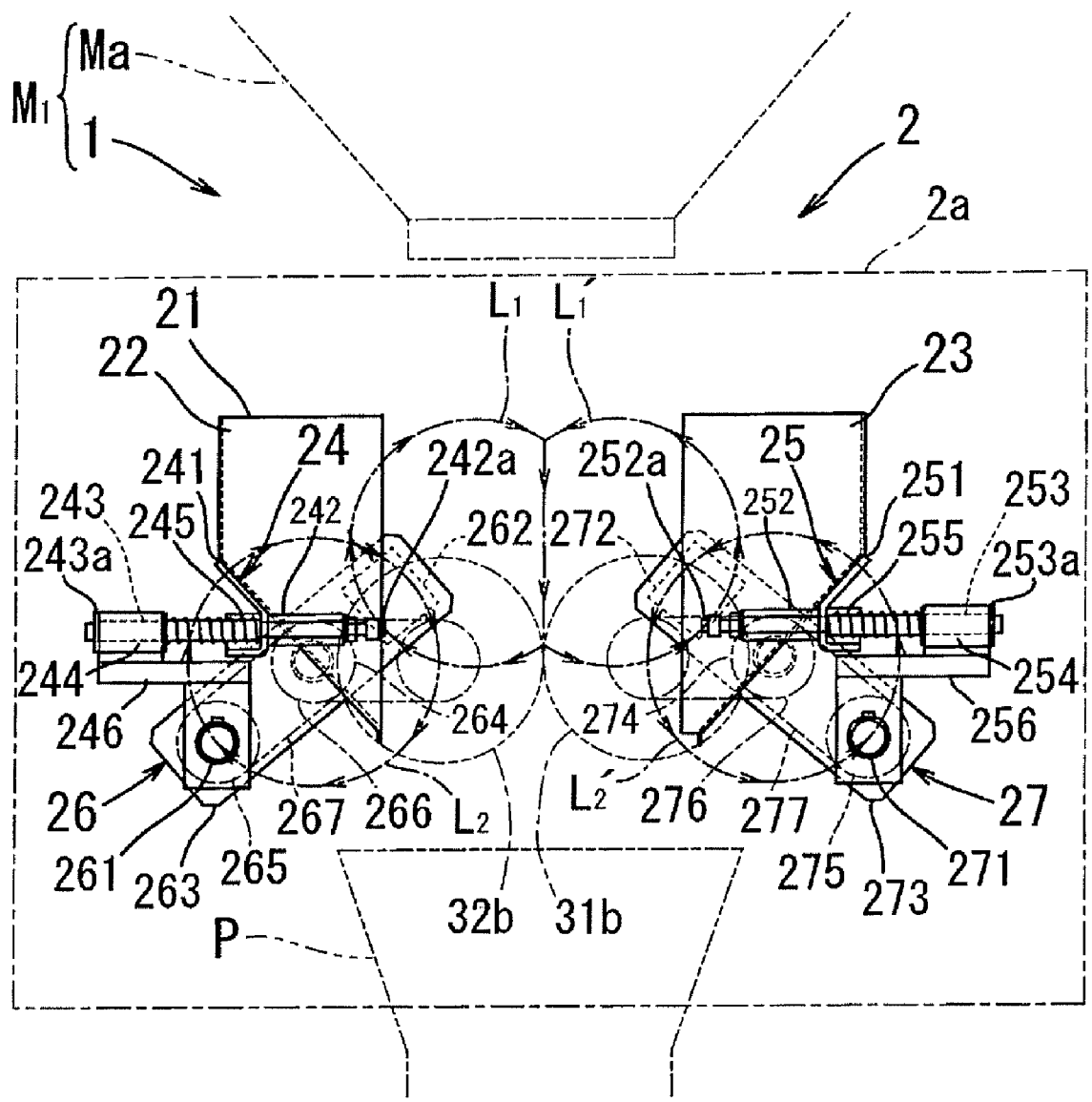
FIG. 4 is a schematic front elevational view of the article transfer device according to the first embodiment and shows the movement of the hopper following a state shown in FIG. 3.

Now, the support units proper 246 and 256 are rotated and moved along circular trajectories $L_2$ and $L_2'$ as shown in FIG. 1 to FIG. 5 by rotary mechanisms 26 and 27 later discussed. The contact members 242 and 252 are slidably supported by the support units proper 246 and 256 via the sliding members 243 and 253 and guide members 244 and 254. As shown in FIG. 1 to FIG. 3, when the gates come closer to each other, the contact members 242 and 252 relatively move in the horizontal direction with respect to the support units proper 246 and 256 while resisting the pressing force by the press members 245 and 255. By this, the gates 22 and 23 are moved downwards along the linear portion of D-shape trajectories $L_1$ and $L_1'$ with the bottom 21a of the hopper 21 closed. The contact members 242 and 252 are equipped with adjust mechanisms for adjusting the length at the head end units 242a and 252a, are able to adjust the positional relation when the gates come closest to each other, and thereby prevent any clearance from being formed between the gates or prevent the gates from being deformed or damaged due to strong interference between the gates.

Rotary Mechanisms 26 and 27

The rotary mechanisms 26 and 27 includes, as shown in FIG. 1 to FIG. 6, support shafts 261 and 271 fixed to support the units proper 246 and 256 and extending in the direction crossing at right angles with the trajectories $L_2$ and $L_2'$, rotating arms 263 and 273 that rotatably support the support shafts 261 and 271 on one end and have balance weights 262 and 272 installed on the other end, and rotate and move the support units proper 246 and 256 along the circular trajectories $L_2$ and $L_2'$, and rotary shafts 264 and 274 driven by a drive unit 3 later discussed and rotating the rotary arms 263 and 273 in an opposite direction at the same rotating speed. Furthermore, to the support shafts 261 and 271, support shafts pulleys 265 and 275 are fixed, to a housing 2a of the transfer unit 2, fixed pulleys 266 and 276 having diameters same as those of the support shaft pulleys 265 and 275 and relatively rotatable to rotary shafts 264 and 274 are fixed, and to these support shaft pulleys 265 and 275 and fixed pulleys 266 and 276, pulley belts 267 and 277 are wound around. Now, because the support shaft pulleys 265 and 275 and fixed pulleys 266 and 276 are designed to set in the same diameter, rotating the rotary shafts 264 and 274 causes the support shafts 261 and 271 to rotate and move along the trajectories $L_2$ and $L_2'$ with a constant figure maintained as shown in FIG. 1 to FIG. 5.

Drive Unit 3

The drive unit 3 has two rotary drive shafts 31 and 32 as shown in FIG. 6, and transmits the rotating drive force to the rotary shafts 264 and 274 via drive pulleys 31a and 32a installed to these, belts 33 and 34 wound around these drive pulleys, and driven pulleys 264a and 274a installed to the rotary shafts 264 and 274 and having belts 33 and 34 wound around. The rotary drive shaft 31 is rotated by a motor 35, and the rotary drive shaft 32 is rotated by engaging a drive gear 32b installed to itself with a drive gear 31b with the same number of teeth installed to the rotary drive shaft 31. By this, the rotary shafts 264 and 274 rotated by the rotary drive shafts 31 and 32 rotate rotary arms 263 and 273 in an opposite direction at the same rotating speed.

Operation of First Embodiment

The operation of the article transfer device 1 of the first embodiment will be described. First of all, at the timing based on dropping and discharging of the goods from the weighing unit Ma installed on the upper side, as shown in FIG. 1, the hopper 21 gets into a state of closing the bottom 21a and linearly moves downwards from the position shown in FIG. 1 to the position shown in FIG. 3 via the position shown in FIG. 2 as if it goes along linear portions of the D-shape trajectories $L_1$ and $L_1'$. During this movement, the hopper 21 receives the goods dropping from above but both the hopper 21 and the bottom 21a, move in the goods dropping direction; therefore, the goods collide against the bottom 21a at a speed obtained from subtracting the speed equivalent to the hopper 21 moving speed from their own dropping speed and are stored in the hopper 21. Then, gates 22 and 23 that form the hopper 21 separate greatly from each other and opens the bottom 21a of the hopper 21 while moving along curve portions of the D-shape trajectories $L_1$ and $L_1'$. In such event, gates 22 and 23 slack off their speed to move downwards and then shift to upward movement. However, on the goods stored inside the hopper, inertia force is exerted by previous downward movement of the hopper 21, and the goods drop and are discharged downwardly with the downward initial speed applied. The gates 22 and 23 move along the curve portions of the trajectories L1 and L1' while discharging the goods, get into a state of closing the bottom 21a of the hopper 21 again, and receive the goods dropping from above while moving downwards.

Features of First Embodiment

The article transfer device 1 and the weighing device $M_1$ equipped with the article transfer device 1 according to the first embodiment have the following features. First, the article transfer device 1 and the weighing device M1 have a feature of the bottom 21a of a closed hopper which moves downwards in concert with the timing of receiving the goods dropping from above. By this feature, the collision speed between the goods dropping from above and the bottom 21a is reduced and as a result, jumping of the goods inside the hopper is suppressed, the goods are able to be smoothly discharged, and damage to the goods due to impacts can be prevented.

Second, the article transfer device 1 and the weighing device $M_1$ have a feature of repeating opening and closing of the bottom 21a, while the bottom units 22a and 23a of the gates 22 and 23 which form the bottom 21a of the hopper 21 continuously move in one direction along the D-shape trajectories $L_1$ and $L_1'$. Consequently, as compared to the conventional hoppers having gates that make reciprocating rotations to open and close, physical burdens to the goods discharging operation can be reduced and the goods can be discharged at still higher speed. Furthermore, the power source (motor 35) required for downward movement and opening and closing of the hopper bottom 21a is shared, and the article transfer device 1 and the weighing device M1 provide advantages of simplifying the construction, etc.

Third, the hopper 21 continues downward movement of the bottom 21a along the D-shape trajectories L1 and L1' until right before the goods discharge begins and through right after the goods discharge begins; therefore, the initial speed headed downwardly is added to the discharged goods by the action of the inertia force. As a result, as compared to the conventional article transfer devices that temporarily bank up the goods dropping from above in stationary hoppers, the hopper 21 is able to quickly discharge the goods and, at the same time, is able to thereby prevent clogging of the goods associated from lowering of the goods discharge speed.

Fourth, the pair of gates 22 and 23 that form the hopper 21 have a feature of coming close to each other and moving downwardly with the bottom 21a closed and then separating from each other to open the bottom 21a. By allowing the pair of gates 22, 23 which are located opposite to each other to separate from each other, a large exhaust port is able to be formed in a short time as compared to the conventional hoppers which allow the gates to reciprocate and rotate to open and close the gates, which is effective for discharging the goods at high speed.

Modification Example of First Embodiment

Figure 8:
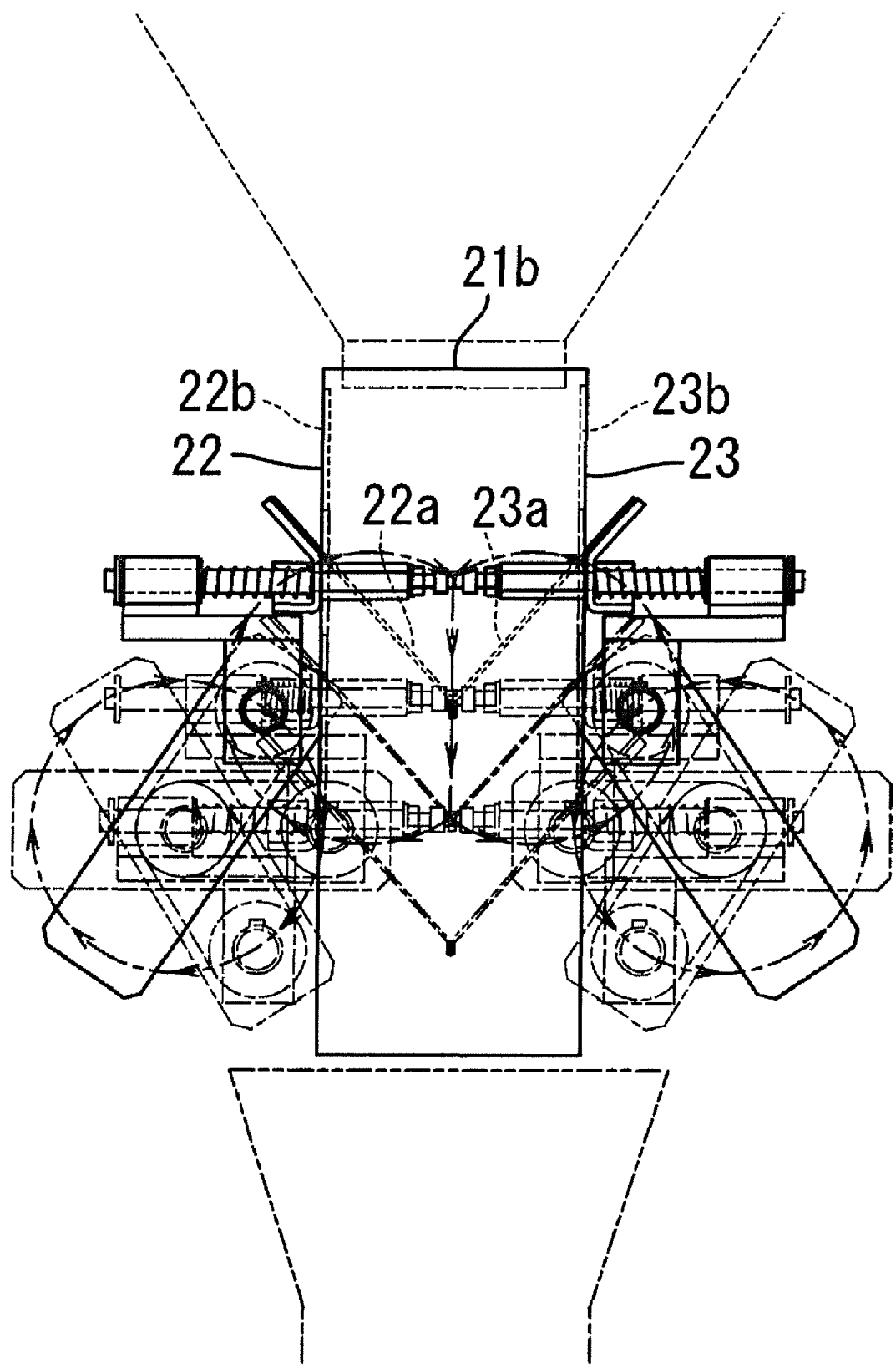
FIG. 8 is a schematic front elevational view showing a modification example of the article transfer device according to the first embodiment.

In the first embodiment, the bucket-shape hopper 21 that could receive the goods by only the gates 22 and 23 was formed, but as shown in FIG. 8 and FIG. 9, gates 22 and 23 may be replaced by plate pieces with a predetermined width, which are formed only by inclined rectangular bottom units 22a and 23a that form an inverted roof-shape bottom 21a, and side surface units 22b and 23b extended from the top end unit to vertically upwards in the same width and at the same time, these plate pieces may be caught between two fixed side walls 21b, 21c extending in a direction that crosses at right angles with the gate width direction to form the hopper 21. This configuration eliminates a need of installing side walls to form a hopper to the gates 22 and 23 proper and can reduce weight of the gate. As a result, a physical burden applied to the gate drive mechanism can be suppressed and still higher speed processing of the goods can be achieved.

Figure 10A:
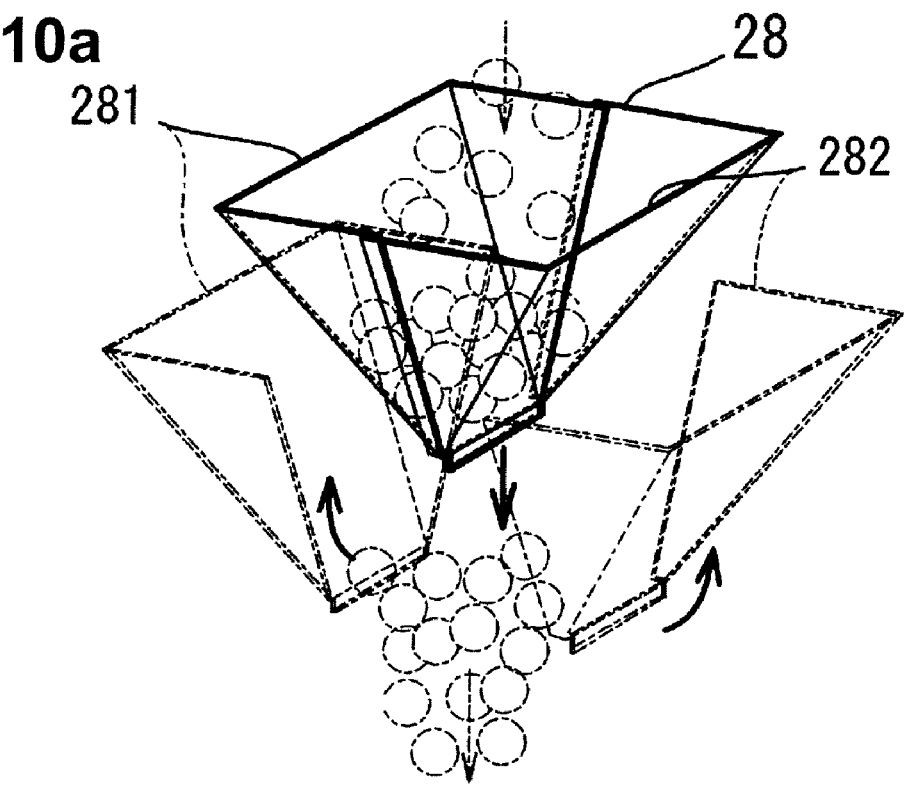
FIGS. 10a and 10b are perspective views of other modification examples of the hopper for the article transfer device of the first embodiment.

In the first embodiment, the hopper 21 was formed by the inverted roof-shape bottom 21a and a cylindrical shape that extends from the peripheral part to upwards in the vertical direction, but as shown in FIG. 10a, a bill-shape hopper 28 whose width is narrowed in the longitudinal and horizontal directions as it goes to the lower side may be adopted. In the hopper 28, the width of the goods which drop and are discharged from the hopper becomes narrow, rendering the hopper 28 capable for feeding and filling the goods smoothly into packaging bags to be set to the goods receiving port or downstream of a packaging device P installed on the lower side. In combination with the structure to separate two pieces of gates 281 and 282 from each other to open the hopper bottom in a short time, this hopper structure is able to feed the goods at still higher speed. In addition, the hopper may not only be formed into the bill-shape but also be formed by gates 291 and 292 that link bottom units 291a and 292a, which bring the bottom ends close to each other and form an inverted roof-shape bottom, to side surface units 291b and 292b, which extend from one side end of the bottom units and cover the side ends of the facing bottom units, in an L-shape in cross-section. According to the hopper 29, in the event that the gates 291 and 292 are separated from each other to open the hopper bottom, facing side surface units 291b and 292b slide in the opposite direction, and therefore, even if the goods solidify inside the hopper, the solidified goods can be broken into pieces and quickly discharged.

Figure 11A:
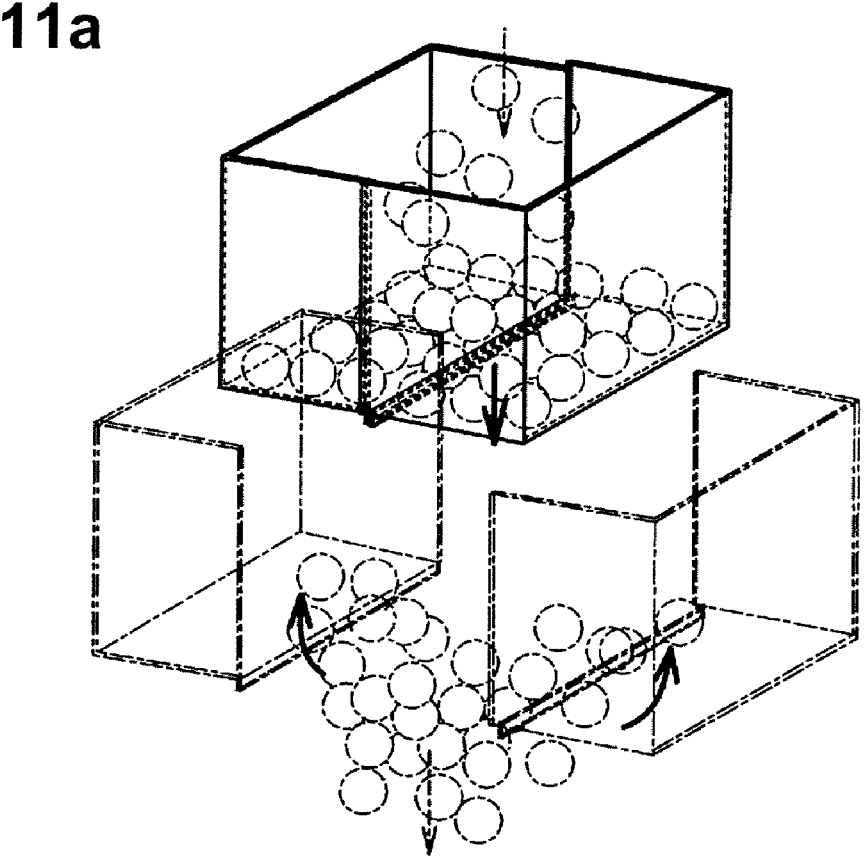
FIGS. 11a and 11b are perspective views of still other modification examples of the hopper for the article transfer device of the first embodiment.
Figure 11B:
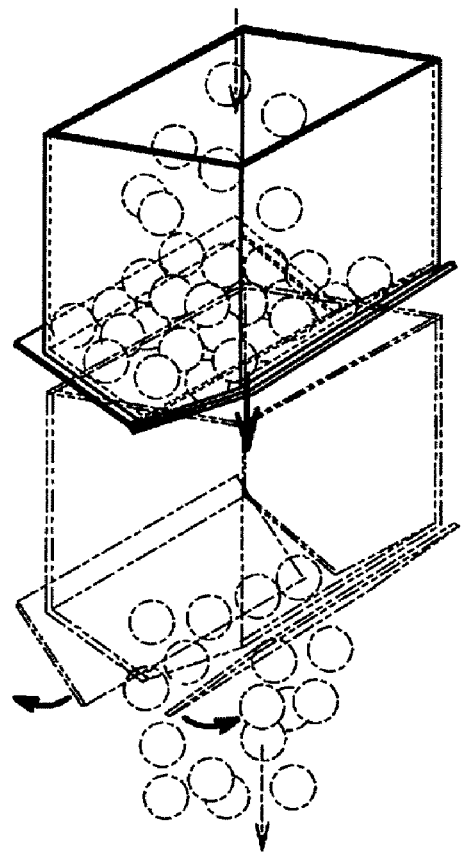

In the first embodiment, the bottom 21a of the hopper 21 was formed into an inverted roof shape but a quadrilateral box-type hopper with a flat bottom as show in FIG. 11a may be adopted. In addition, in the first embodiment, the hopper bottom was brought to be close to each other and separate from each other to be opened and closed by allowing two gates to move along the D-shape trajectories, but as shown in FIG. 11b, a hopper having gates that make reciprocating rotations to open and close at the bottom may be adopted, and when the goods are received, the hopper may move downwards with the gates closed and open the gates when the goods are discharged. This kind of hopper also alleviates collision of the goods against the hopper bottom and at the same time the goods are quickly discharged when the gate is opened by the inertia force resulting from downward movement of the hopper.

In the first embodiment, the downward movement speed of the hopper 21 was set to be slower than the dropping speed of the goods discharged from the weighing unit Ma, but the present invention shall not be limited to this and the downward movement speed of the hopper 21 may be set to the same as or quicker than the dropping speed of the goods discharged from the weighing unit Ma. By setting the speed in this way, the collision speed of the goods against the bottom 21a of the hopper 21 can be brought to zero or the collision can be eliminated. It is therefore possible to more definitely avoid jumping of or damage to the goods inside the hopper due to the impact when the goods drop. In addition, the goods can be supplied to the packaging device P without impairing the dropping speed of the goods generated by the discharge from the weighing unit Ma; therefore, processing at still faster speed than that of the article transfer device 1 according to the embodiment can be achieved. Furthermore, the hopper 21 plays a role of a windshield that covers the dropping goods from below by moving downwards ahead of the goods and reduces air resistance applied to the goods. This allows lightweight goods such as corn confectionery to be supplied at higher speed than that when the goods are dropped directly from the weighing unit Ma to packaging device P without using any hopper. The hopper 21 holds together the goods received without extending their width in the lateral direction in the partitions formed by the gates 22 and 23 so that the packaging device P and packaging bags set to the device can be smoothly filled with the goods.

In the first embodiment, by installing the contact members 242 and 252, the gates are prevented from being strongly interfered with each other when the gates 22 and 23 come close to each other, but the contact members 242 and 252 may be eliminated and predetermined strength may be given to the gate itself so that the gate can be used as a contact member. Furthermore, in the first embodiment, the gates 22 and 23 are configured to repeat downward movement with the bottom 21a closed and upward movement with the bottom 21a open by being rotated to be moved by the rotary mechanisms 26 and 27, but in place of this, for example, a box motion mechanism adopted for a longitudinal sealing device of a packaging machine described in Japanese Unexamined Patent Publication No. 63-272645 may be adopted.

In the first embodiment, an example of configuring the weighing device $M_1$ equipped with the weighing unit Ma that discharges the goods weighed to predetermined weight and the article transfer device 1 that receives the goods dropping and discharged from the weighing unit Ma and discharges them downwardly was described, but a packaging device equipped with the article transfer device and a packaging unit that is installed below the goods transfer unit, receives the goods discharged from the article transfer device, and fills and packages the goods into packaging containers may be configured.

Second Embodiment

Article Transfer Device 4

Figure 12:
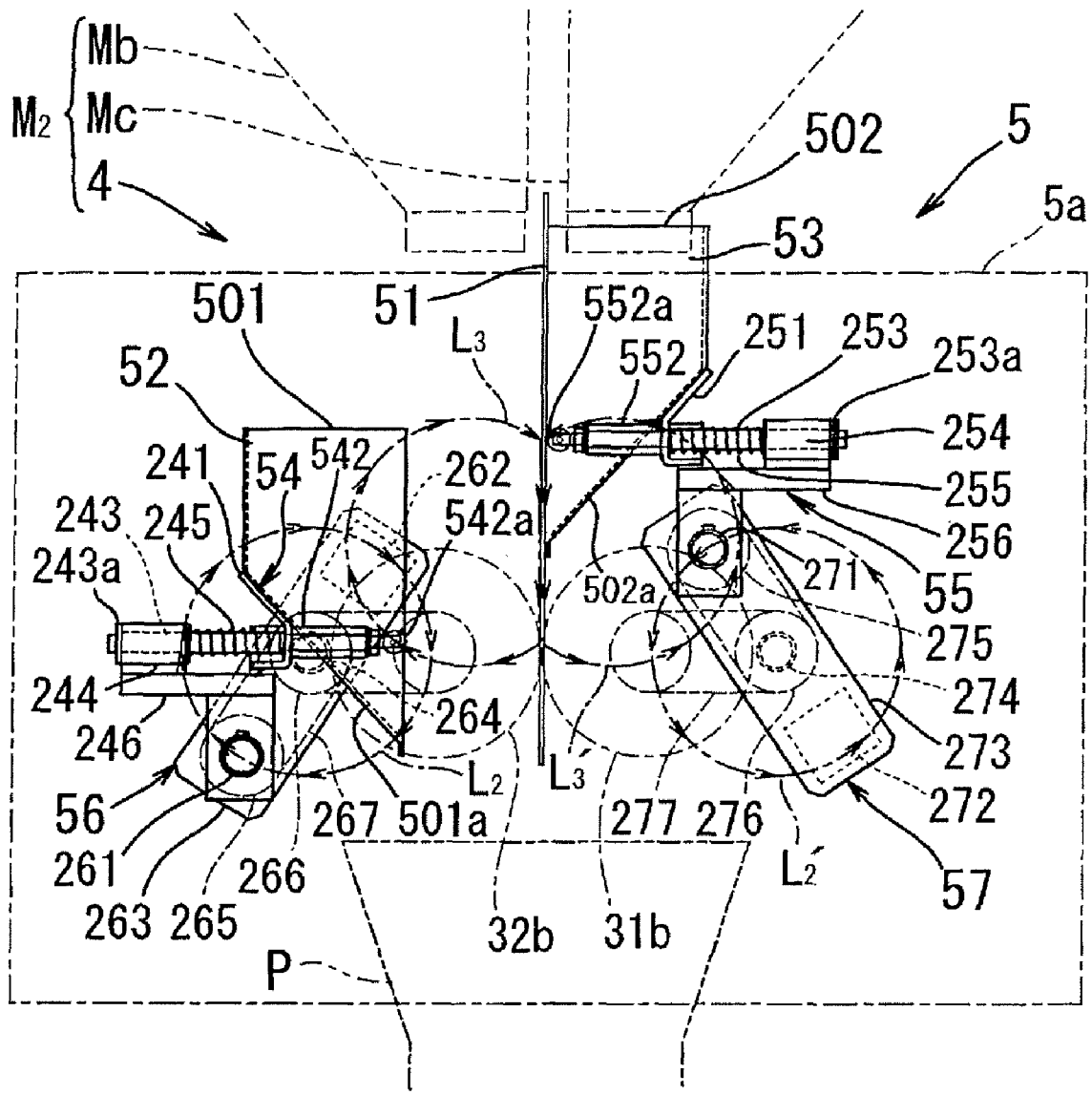
FIG. 12 is a schematic front elevational view of an article transfer device according to the second embodiment.
Figure 13:
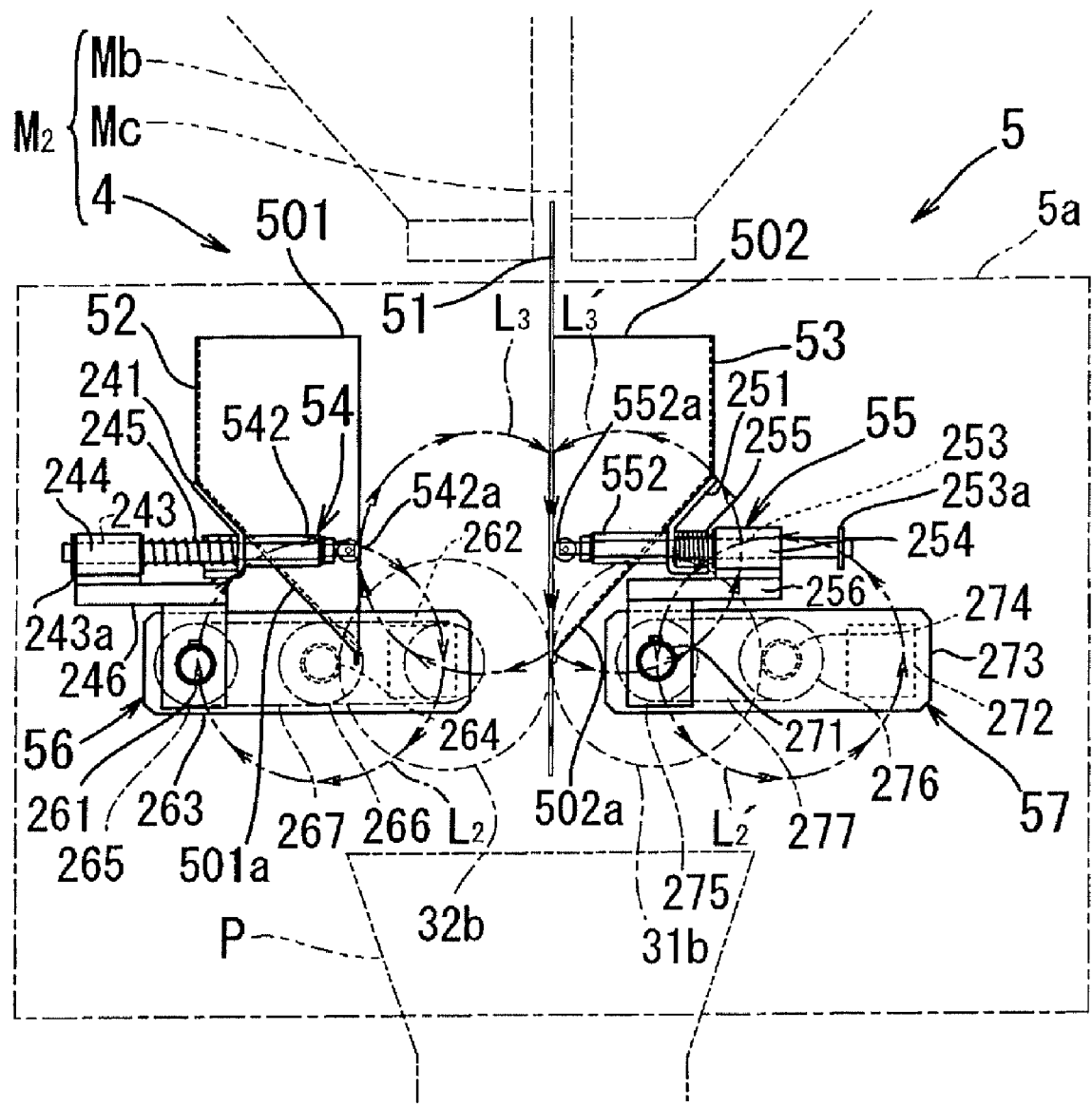
FIG. 13 is a schematic front elevational view of the article transfer device according to the second embodiment and shows the movement of a hopper following a state shown in FIG. 12.

FIG. 12 to FIG. 14 are front views illustrating the movement of an article transfer device 4 according to the second embodiment of the present invention. FIG. 15 is a perspective view showing hoppers 501 and 502 installed to the article transfer device 4. In FIG. 12 to FIG. 14, like reference characters in FIG. 1 to FIG. 6 designate components common to the article transfer device 1 according to the first embodiment and their detailed description will be omitted. The article transfer device 4 forms a part of a weighing device $M_2$ together with two weighing units Mb and Mc that discharge the goods weighed to predetermined weight, and receives the goods that drop and are discharged at predetermined intervals alternately from the weighing units Mb and Mc installed above and discharges the goods to a packaging device P installed below. The packaging device P receives the goods discharged from the article transfer device 4 and fills and packages the goods into packaging bags. The article transfer device 4 includes a transfer unit 5 equipped with hoppers 501 and 502 that receive the goods dropping from above and discharge them downwardly and a drive unit 3 that drive the hoppers 501 and 502.

Transfer Unit 5

The transfer unit 5 is equipped with a fixed wall 51 fixed inside a housing 5*a* of the transfer unit 5 and installed vertically as if the fixed wall 51 partitions the goods dropping alternately from weighing units Mb and Mc, hoppers 501 and 502 composed with two gates 52 and 53 installed to both side surfaces of the fixed wall 51 so as to face each other, gate support units 54 and 55 that slidably support the gates 52 and 53 in the horizontal direction (right and left direction in the figure), and a pair of rotary mechanisms 56 and 57 that continuously rotate the gate support units 54 and 55 in one direction while maintaining them to a constant figure. In this embodiment, the gate support units 54 and 55 and the rotary mechanisms 56 and 57 constitute the hopper moving mechanism. The gates 52 and 53 move downwards in a state most adjacent to the fixed wall 51 along each of D-shape trajectories $L_3$ and $L_3'$ (movement path) drawn bilaterally-symmetrically with the fixed wall 51 in-between. Then, the gates 52 and 53 move downwards to the lowermost end position in a state separated from the fixed wall 51, move upwards from the lowermost end position to the uppermost end position in a state separated from the fixed wall 51, and repeats again moving downwards from the uppermost end position to the position where the gates come closest to the fixed wall 51. The hoppers 501 and 502 have a series of operation cycle composed with the downward movement and the upward movement deviated by ½ cycle only so that the hoppers 501 and 502 receive the goods dropping alternately from the weighing units Mb and Mc, respectively, and supply the received goods alternately to the packaging device P. The trajectories $L_3$ and $L_3'$ in FIG. 12 to FIG. 14 are trajectories of head-end units 542*a* and 552*a* of contact members 542 and 552 installed integrally to the gates 52 and 53.

Hoppers 501 and 502, Fixed Wall 51, and Gates 52 and 53

The hoppers 501 and 502 are formed by the fixed wall 51 fixed inside the housing 5*a* and the two gates 52 and 53 installed opposite to the fixed wall 51 as described above. The gates 52 and 53 are equipped with rectangular bottom units 52*a* and 53*a* that are inclined downwards toward the fixed wall 51 and form bottoms 501*a* and 502*a* of the hoppers 501 and 502, and inverted U-shaped side surface units 52*b* and 53*b* as viewed two-dimensionally which are extended from three sides other than a lower end unit facing the fixed wall 51 in the bottom units 52*a* and 53*a* to upwards as shown in FIG. 15. These gates become a bucket-shape hopper with the bottom closed when the gates come closest to the fixed wall 51 as is the case of the gate 53 shown in FIG. 15, receive the goods dropping from above, and temporarily store the goods inside the hopper, whereas as is the gate 52 shown in FIG. 13, the gate has its bottom opened when the gate is separated from the fixed wall 51 and drops and discharges the goods stored inside the hopper.

That is, the gates 52 and 53 continuously move along each of the D-shape trajectories $L_3$ and $L_3'$ as shown in FIG. 12 to FIG. 14, and repeat: (1) coming closest to the fixed wall 51 to close the bottoms 501*a* and 502*a* of the hoppers 501 and 502 and moving downwards in a state ready to receive the goods dropping from above; (2) moving downwards to the lowermost end position while changing the state from the closed bottoms 501*a* and 502*a* to the state in which the gates 52 and 53 are separated from the fixed wall 51 and are ready to discharge the goods; (3) moving upwards from the lowermost end position to the uppermost end position with the gates separated from the fixed wall 51*s* to keep the bottom 501*a* and 502*a* open; and (4) moving downwards from the uppermost end position to the position where the gates come closest to the fixed wall 51 again to close the bottoms 501*a* and 502*a*. The downward moving speed of the hoppers 501 and 502 is set to be slower than the dropping speed of the goods discharged from the weighing units Mb and Mc in order to temporarily store the goods discharged from the weighing units Mb and Mc in the hopper.

Gate Support Units 54 and 55

The gate support units 54 and 55 adopt the construction basically common to the first embodiment, and support brackets 241 and 251, sliding members 243 and 253, guide members 244 and 254, press members 245 and 255, and support units proper 246 and 256 are of the same construction as that of the gate support units 24 and 25 according to the first embodiment, but contact members 542 and 552 installed to the support brackets 241 and 251 differ from the contact members 242 and 252 according to the first embodiment in that rollers are added to the head end that comes in contact with the fixed wall 51. The support units proper 246 and 256 are rotated and moved along the trajectories $L_2$ and $L_2'$ by rotary mechanisms 56 and 57 later discussed; then, the rollers come in contact with the fixed wall 51 and roll, and the support units proper 246 and 256 are thereby able to move downwards along the linear portion of the D-shape trajectories $L_3$ and $L_3'$.

Rotary Mechanisms 56 and 57

The rotary mechanisms 56 and 57 adopt the construction basically common to the first embodiment, and support shafts 261 and 271, balance weights 262 and 272, support units proper 246 and 256, rotary arms 263 and 273, rotary shafts 264 and 274, support shafts pulleys 265 and 275, fixed pulleys 266 and 276, and pulley belts 267 and 277 are all of the same construction components. However, as described above, in order to allow the hoppers 501 and 502 to receive the goods alternately and to discharge the goods alternately, one of the rotary arm is fixed to the rotary shaft with the rotation phase deviated by 180 degrees, and this is the point that differs from the rotary mechanisms 26 and 27 of the first embodiment. The drive unit 3 that rotates and drives the rotary mechanisms 56 and 57 adopts the construction common to that of the first embodiment, and rotary arms 263 and 273 rotate at the same rotating speed in the opposite direction along the circular trajectories $L_2$ and $L_2'$ as is the case of the first embodiment.

Operation of Second Embodiment

The operation of the article transfer device 4 of the second embodiment will be described. First of all, at the timing based on dropping and discharging of the goods from the weighing unit Mc installed on the upper side, as shown in FIG. 15, the gate 53 gets into a state of closing the bottom 502a of the hopper 502 and moves downwards from the position shown in FIG. 12 to the position shown in FIG. 14 via the position shown in FIG. 13 as if it goes along linear portions of the D-shape trajectories $L_3$ and $L_3'$. During this period, the hopper 502 receives the goods dropping from above but the bottom 502a of the hopper 502 also move in the goods dropping direction; therefore, the goods collide against the bottom 502a at a speed obtained from subtracting the speed equivalent to the hopper 502 dropping speed from their own dropping speed and are stored in the hopper 502. On the other hand, the gate 52 that forms the hopper 501 which operates by ½ cycle deviated moves along the curve portion of the D-shape trajectory $L_3$ with the bottom 501a closed and as shown in FIG. 15, greatly separates from the fixed wall 51, and opens the bottom 501a of the hopper 501. In such event, the goods stored inside the hopper 501 is subject to inertia force exerted by previous downward movement and are discharged downwardly with the downward initial speed applied. Thereafter, the gates 52 and 53 make opposite movements alternately in that the gate 52 receives the goods while making the downward movement same as that of the gate 53 discussed above, while the gate 53 discharges the goods while making the upward movement same as that of the gate 52 discussed above.

Features of Second Embodiment

The article transfer device 4 and the weighing device $M_2$ equipped with the article transfer device 4 according to the second embodiment have the following features. First, the article transfer device 4 and the weighing device $M_2$ have a feature in that hoppers 501 and 502 installed to the positions corresponding to each of the weighing units Mb and Mc move downwards with the bottom 501a and 502a of the hoppers 501 and 502 closed according to the timing of receiving the goods dropping from above. By this, the collision speed of the goods dropping from above against the hopper bottoms 501a and 502a is reduced and as a result, jumping of the goods inside the hoppers and damage to the goods due to impacts are prevented.

Second, the article transfer device 4 and the weighing device $M_2$ have a feature of repeating opening and closing of the bottoms 501a and 502a, respectively, while the bottom units 52a and 53a of the gates 52 and 53 which form the bottoms 501a and 502a of the hoppers 501 and 502 continuously move in one direction along the D-shape trajectories $L_3$ and $L_3'$. Thus, same as the first embodiment discussed above, physical burdens to the goods discharging operation can be reduced and the goods can be discharged at still higher speed.

Third, the hoppers 501 and 502 continue downward movements of the bottoms 501a and 502a along the D-shape trajectories $L_3$ and $L_3'$ until right before the goods discharge begins and through right after the goods discharge begins; therefore, the initial speed headed downwardly is added to the discharged goods by the action of the inertia force. As a result, as compared to the conventional article transfer devices that temporarily bank up the goods dropping from above in stationary hoppers, the hopper can quickly discharge the goods and at the same time, thereby prevent clogging of the goods associated from lowering of the goods discharge speed.

Fourth, the article transfer device 4 and the weighing device $M_2$ have a feature of opening the bottoms 501a and 502a by separating the gates 52 and 53 from the fixed wall 51. The gates 52 and 53 can form a larger discharge port in a shorter time by separating them from the fixed wall 51 as compared to the conventional hoppers which reciprocately rotate to open and close gates and high-speed discharge of goods can be achieved. In addition, because the goods discharged diagonally downwards along the inclined bottom units 52a and 53a of the gates are guided by the fixed wall 51 installed vertically, the goods are prevented from being expanded to the periphery and the goods filling efficiency can be still more increased.

Fourth, the article transfer device 4 and the weighing device $M_2$ have a feature in that the gates 52 and 53 are installed on both sides of the fixed wall 51 and the hoppers 501 and 502 which each gate forms repeat closing and opening to alternately receive and discharge the goods. Consequently, increasing the goods feeding cycle by alternately feeding the goods from the weighing units Mb and Mc installed above each gate can still more increase the goods discharge cycle accordingly.

Modification Example of Second Embodiment

In the second embodiment, two gates 52 and 53 which face each other are installed on both side surfaces of the fixed wall 51, but for example, the gate 52 and all the mechanisms to operate the gate 52 are eliminated and as shown in FIG. 16, one gate 53 only may be installed on one side of the fixed wall 51. As compared to the case in which two gates are installed, the goods discharge cycle is suppressed to low speed but only one rotary shaft is required to rotate and move the gate, and therefore, a drive unit that rotates and drives the rotary shaft may be a uniaxial drive unit. As a result, there is no need to install a drive gear for distributing the drive force as is the case of the drive unit 3 according to the first embodiment, and miniaturization, reduced cost, and easy maintenance of the device can be achieved. In the article transfer device 4 shown in FIG. 16, the fixed wall 51 is extended downwards to be longer than the second embodiment so that the goods discharged from the hopper 502 can be guided close to the goods receiving port of the packaging device P. This configuration achieves quick feeding of the goods to the packaging device P.

For the second embodiment, too, same as the first embodiment, the downward movement speed of the hopper bottoms 501a and 502a may be set to the same as or quicker than the dropping speed of the goods discharged from the weighing units Mb and Mc. By setting the speed in this way, it is possible to avoid jumping of or damage to the goods inside the hopper due to the impact when the goods drop. In addition, the goods can be supplied to the packaging device P without impairing the dropping speed of the goods generated by the discharge from the weighing unit. Furthermore, the hoppers 501 and 502 play a role of a windshield that covers the dropping goods by moving downwards ahead of the goods and reduce air resistance applied to the goods. Needless to say, because the hoppers hold together the goods received without extending their width in the lateral direction, the packaging device and packaging bags set to the device can be smoothly filled with the goods.

Figure 10B:
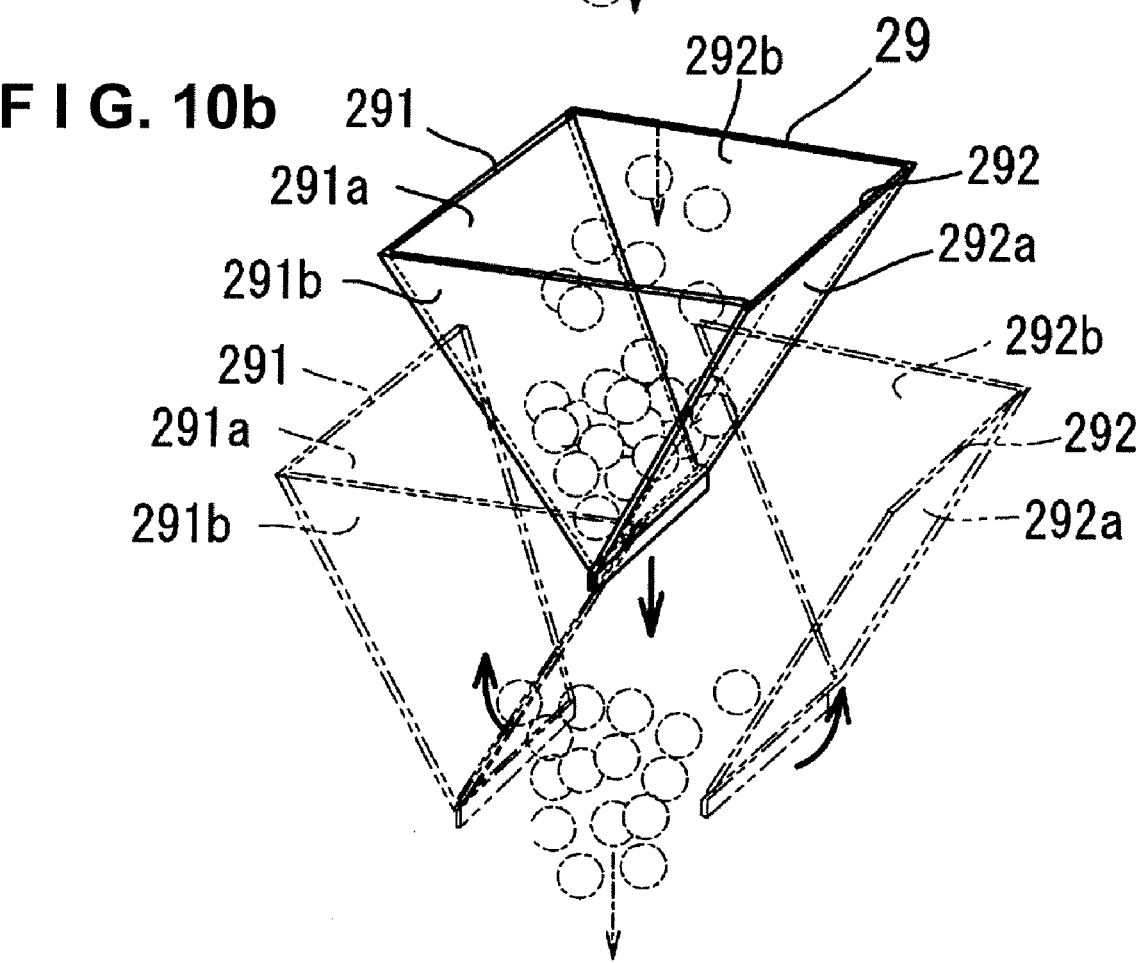

In the second embodiment, the gates 52 and 53 were moved along the D-shape trajectories, but same as the modification example of the first embodiment, they may be moved by the box-motion mechanism. In addition, in place of the gates 52 and 53, gates as shown in FIGS. 10a and 10b or FIG. 11a may be combined to the fixed wall. In addition, the article transfer device 4 may be combined with a packaging unit that is installed below the article transfer device 4 and fills and packages the goods into packaging containers to form a packaging device.

The invention claimed is:

1. An article transfer device comprising:
a hopper configured and arranged to receive articles dropping from above and to discharge the articles downwardly; and
a hopper moving mechanism configured and arranged to move at least a bottom portion of the hopper downwardly with the bottom portion of the hopper being closed when the hopper receives the articles and to open the bottom portion of the hopper to discharge the articles from the hopper,
the hopper including a pair of plate members with a predetermined width, the plate members being disposed between a pair of fixed side wall members extending in a direction perpendicular to a width direction of the plate members, and
the hopper moving mechanism being configured and arranged to move the plate members close to each other to close the bottom portion of the hopper, to move the plate members downwardly with the bottom portion of the hopper being closed, and to separate the plate members away from each other to open the bottom portion of the hopper.

2. The article transfer device according to claim 1, wherein
the hopper moving mechanism is configured and arranged to discharge the articles after the articles are temporarily stored inside the hopper.

3. The article transfer device according to claim 1, wherein
the hopper moving mechanism is configured and arranged to move at least the bottom portion of the hopper continuously in one direction along a movement path.

4. A weighing device comprising:
a weighing unit configured and arranged to discharge articles weighed to a predetermined weight; and
the article transfer device according to claim 1 to transfer the articles discharged from the weighing unit downwardly.

5. A packaging device comprising
the article transfer device according to claim 1 to transfer articles dropping from above and to discharge the goods downwardly; and
a packaging unit configured and arranged to receive the articles discharged from the article transfer device and to fill and package the articles into packaging containers.

6. An article transfer device comprising:
a hopper configured and arranged to receive articles dropping from above and to discharge the articles downwardly; and
a hopper moving mechanism configured and arranged to move at least a bottom portion of the hopper downwardly with the bottom portion of the hopper being closed when the hopper receives the articles and to open the bottom portion of the hopper to discharge the articles from the hopper,
the hopper including a fixed wall, a gate installed opposite to the fixed wall, and an additional gate installed on an opposite side from the gate with respect to the fixed wall, and
the hopper moving mechanism being configured and arranged to alternately move the gate and the additional gate downwardly with a lower end part of the gate or the additional gate, which is being moved, being adjacent to the fixed wall and so that the articles are discharged from the gate and the additional gate alternately.

* * * * *